United States Patent
Sun et al.

(10) Patent No.: US 12,289,714 B2
(45) Date of Patent: Apr. 29, 2025

(54) NETWORK NODE, USER EQUIPMENT AND METHODS PERFORMED THEREIN IN A WIRELESS COMMUNICATIONS NETWORK

(71) Applicant: Telefonaktiebolaget LM Ericsson (PUBL), Stockholm (SE)

(72) Inventors: Ying Sun, Täby (SE); Lisa Boström, Solna (SE); Anders K. Eriksson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 443 days.

(21) Appl. No.: 17/429,426

(22) PCT Filed: Jul. 1, 2019

(86) PCT No.: PCT/SE2019/050649
§ 371 (c)(1),
(2) Date: Aug. 9, 2021

(87) PCT Pub. No.: WO2020/167176
PCT Pub. Date: Aug. 20, 2020

(65) Prior Publication Data
US 2022/0132502 A1 Apr. 28, 2022

Related U.S. Application Data

(60) Provisional application No. 62/806,092, filed on Feb. 15, 2019.

(51) Int. Cl.
*H04W 72/04* (2023.01)
*H04W 28/02* (2009.01)
(Continued)

(52) U.S. Cl.
CPC ... *H04W 72/0453* (2013.01); *H04W 28/0294* (2013.01); *H04W 72/23* (2023.01)

(58) Field of Classification Search
CPC ............. H04W 72/0453; H04W 72/23; H04W 28/0294
See application file for complete search history.

(56) References Cited

U.S. PATENT DOCUMENTS

| | | | |
|---|---|---|---|
| 2010/0190505 A1* | 7/2010 | Shiizaki | H04W 52/0261 455/574 |
| 2018/0176945 A1* | 6/2018 | Cao | H04L 1/1877 |

(Continued)

OTHER PUBLICATIONS

PCT International Search Report issued for International application No. PCT/SE2019/050649—Oct. 18, 2019.
(Continued)

*Primary Examiner* — Brenda H Pham
(74) *Attorney, Agent, or Firm* — Baker Botts L.L.P.

(57) ABSTRACT

Embodiments herein relate to a method, performed by a network node (110) in a wireless communication system (100), for handling resource allocations for a first User Equipment, UE (120a) out of a set of UEs (120). Each of the UEs (120) in the set of UEs 5(120) has a different preconfigured frequency allocation for cyclic transmissions, such as cyclic UL and/or DL transmissions. The network node (110) determines, based on a data arrival pattern, such as e.g. a packet arrival time, of the cyclic UL transmissions for each of the UEs in the set of UEs (120), one or more TTIs, where a collision between transmissions to and/or from two UEs (120) out of the set of UEs (120) may occur. The 10 network node (110) reconfigures the frequency allocation for a first UE (120a) of the two UEs (120) to overlap, at least partly, with the frequency of a second UE (120b) of the two UEs (120) for the TTIs other than the TTIs where the collision between the transmissions to and/or from the first and the second UEs (120a, 120b) may occur. Embodiments herein further relate to a method, performed by the first UE (120a) out of the set of UEs (120) in 15 the
(Continued)

wireless communication system (100), for handling resource allocation for the first UE (120*a*) out of the set of UEs (120).

13 Claims, 23 Drawing Sheets

(51) Int. Cl.
*H04W 72/0453* (2023.01)
*H04W 72/23* (2023.01)

(56) References Cited

U.S. PATENT DOCUMENTS

2018/0368175 A1* 12/2018 Jeon ..................... H04W 72/04
2019/0090245 A1*  3/2019 Ansari ................. H04W 72/52
2021/0360695 A1* 11/2021 Zhou ................. H04W 74/0825

OTHER PUBLICATIONS

PCT Written Opinion of the International Searching Authority issued for International application No. PCT/SE2019/050649—Oct. 18, 2019.

* cited by examiner

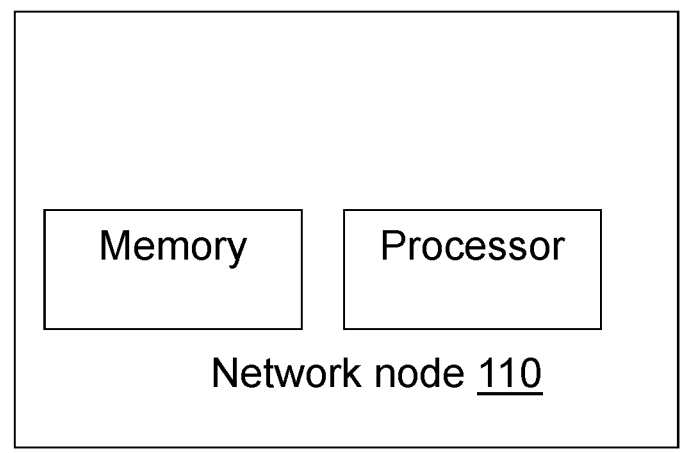
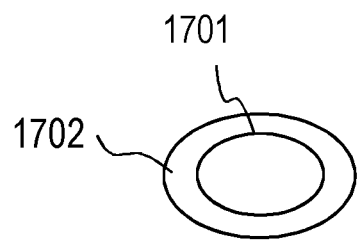
Fig. 17

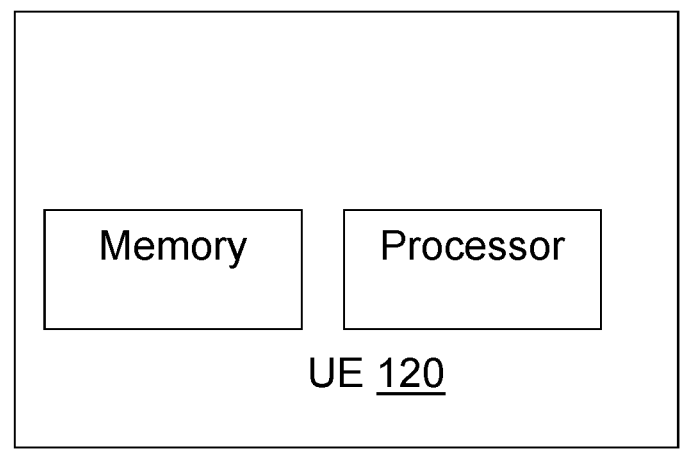
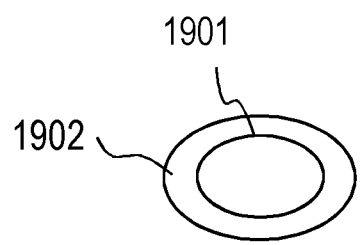
Fig. 19

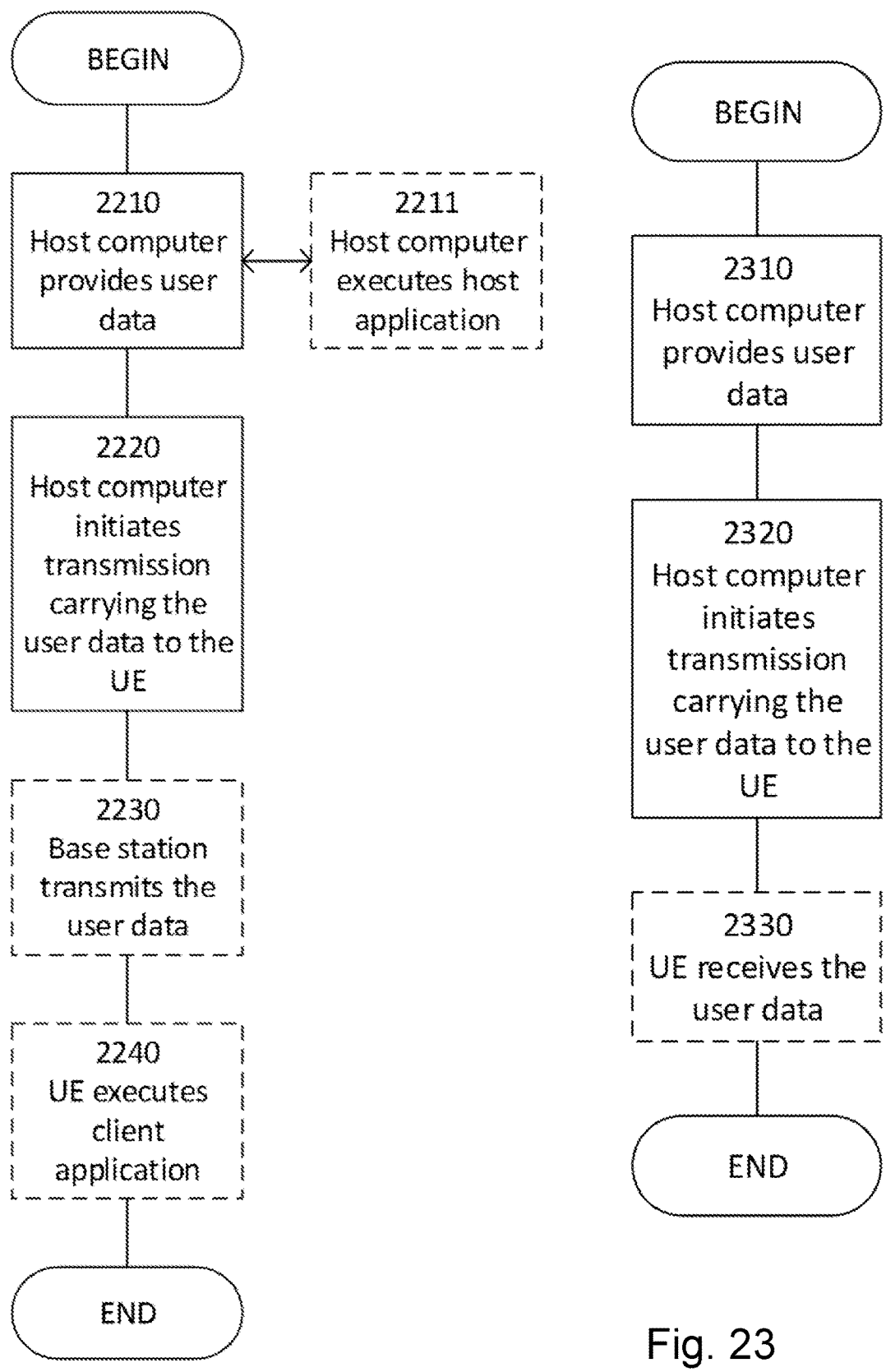

NETWORK NODE, USER EQUIPMENT AND METHODS PERFORMED THEREIN IN A WIRELESS COMMUNICATIONS NETWORK

PRIORITY

This nonprovisional application is a U.S. National Stage Filing under 35 U.S.C. § 371 of International Patent Application Serial No. PCT/SE2019/050649 filed Jul. 1, 2019 and entitled "NETWORK NODE, USER EQUIPMENT AND METHODS PERFORMED THEREIN IN A WIRELESS COMMUNICATIONS NETWORK" which claims priority to U.S. Provisional Patent Application No. 62/806,092 filed Feb. 15, 2019 both of which are hereby incorporated by reference in their entirety.

TECHNICAL FIELD

Embodiments herein relate to devices and methods for handling resource allocations for a User Equipment (UE) in a communications network. In particular, the embodiments herein refer to a network node and a UE and methods therein for handling resource allocations for the UE.

BACKGROUND

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In a typical wireless communication network, User Equipment (UE), also known as wireless devices, wireless communication devices, mobile stations, and/or stations (STA) communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

In NR 3GPP Release 15 (rel-15) Uplink (UL) traffic may be scheduled with dynamic UL grants or configured UL grants. In case of dynamic grants, the gNB may provide an UL grant to the UE for each UL transmission. Configured grants (CG) are pre-allocated, i.e. provided once to the UE, thereafter the configured UL grant is valid for usage for UL transmissions according to a configured periodicity. The UE does not need to transmit padding on pre-allocated UL resources if no UL data is available for transmission, i.e. the UE may skip an UL transmission on such grants.

NR further supports two types of transmissions, which are referred to as Type A and Type B transmissions. Type A transmissions are slot-based, where a slot is defined as 14 OFDM symbols, while Type B is non-slot-based. The purpose of the Type B transmission is to enable making short transmissions that can start and end in a more flexible way than the Type A transmission. Mini-slot transmissions may be dynamically scheduled and in 3GPP rel-15 they:

(1) May be of length 7, 4, or 2 symbols in Downlink (DL) and UL.

(2) May start and end within in any symbol within a slot.

NR supports higher sub-carrier spacing in addition to the 15 KHz supported by LTE. The length of the slot and symbol also depends on the numerology. On carrier frequencies below 6 GHz the numerologies 15 kHz and 30 kHz Sub-Carrier Spacing (SCS) is supported while 60 kHz SCS is optional for the UE. The 15 kHz SCS equals the LTE numerology for a normal cyclic prefix.

Type B transmissions are important for Ultra-Reliable Low-Latency Communication (URLLC) since they reduce latency; the transmissions may be scheduled and start sooner than for slot-based transmissions where scheduling and transmissions have to wait until the next slot.

NR further supports two types of configured grants, Type 1 and Type 2. For Type 1 the UE is Radio Resource Control (RRC) configured with a grant that indicates all needed transmission parameters while for Type 2 the configured grant is partly RRC configured and partly Layer 1 (L1) signaled using Downlink Control Information (DCI) signaling. For Type 2 configured grant, the resource allocation follows an UL grant received on the DCI and the resource then recurs periodically, wherein the period is configured by RRC. The UL grant comprises a time domain resource assignment field that provides a row index of a higher layer configured table pusch-symbolAllocation. The indexed row defines a slot offset (K2), a start and length indicator (SLIV), and a Physical Uplink Shared Channel (PUSCH) mapping type to be applied in the PUSCH transmission. The UE transmits a Medium Access Control-Control Element (MAC-CE) confirm message when the configured grant is activated or deactivated.

For DL, NR also supports DL Semi Persistent Scheduling (SPS). DL SPS is similar configured grants in UL. The DL assignments are pre-allocated, i.e. provided once to the UE, thereafter the periodically recurring DL assignments are valid according to a configured periodicity without the gNB explicitly transmitting the DL assignments on DCI.

In 3GPP NR Rel-15 semi-persistent scheduling for UL is available in two types, namely Configured grant Type 1 and Type2. For Type 1 the configured grant is fully RRC configured while Type 2 is partly RRC configured and partly dynamically indicated. The RRC information element for configuration of Configured grant looks as follows, see 3GPP TS 38.331 Section 6.3.2:

```
-- ASN1START
-- TAG-CONFIGUREDGRANTCONFIG-START
ConfiguredGrantConfig ::=                       SEQUENCE {
    frequencyHopping                            ENUMERATED {mode1, mode2}
                    OPTIONAL, -- Need S,
    cg-DMRS-Configuration                       DMRS-UplinkConfig,
            mcs-Table
                                                ENUMERATED {qam256, spare1}
        OPTIONAL, -- Need S
    mcs-TableTransformPrecoder                  ENUMERATED {qam256, spare1}
                    OPTIONAL, -- Need S
    uci-OnPUSCH                                 SetupRelease { CG-UCI-OnPUSCH },
    resourceAllocation                          ENUMERATED { resourceAllocationType0,
resourceAllocationType1, dynamicSwitch },
    rbg-Size                                    ENUMERATED {config2}
            OPTIONAL, -- Need S
    powerControlLoopToUse                       ENUMERATED {n0, n1},
    p0-PUSCH-Alpha                              P0-PUSCH-AlphaSetId,
    transformPrecoder                           ENUMERATED {enabled}
            OPTIONAL, -- Need S
    nrofHARQ-Processes                          INTEGER(1 . . 16),
    repK                                        ENUMERATED {n1, n2, n4, n8},
    repK-RV                                     ENUMERATED {s1-0231, s2-0303, s3-0000}
                OPTIONAL, -- Cond RepK
    periodicity                                 ENUMERATED {
                                                    sym2, sym7, sym1x14, sym2x14, sym4x14,
sym5x14, sym8x14, sym10x14, sym16x14, sym20x14,
                                                    sym32x14, sym40x14, sym64x14,
sym80x14, sym128x14, sym160x14, sym256x14, sym320x14, sym512x14,
                                                    sym640x14, sym1024x14, sym1280x14,
sym2560x14, sym5120x14,
                                                    sym6, sym1x12, sym2x12, sym4x12,
sym5x12, sym8x12, sym10x12, sym16x12, sym20x12, sym32x12,
                                                    sym40x12, sym64x12, sym80x12,
sym128x12, sym160x12, sym256x12, sym320x12, sym512x12, sym640x12,
                                                    sym1280x12, sym2560x12
                                                },
    configuredGrantTimer                        INTEGER (1..64)
                OPTIONAL, -- Need R
    rrc-ConfiguredUplinkGrant                   SEQUENCE {
        timeDomainOffset                        INTEGER    (0 . . 5119),
        timeDomainAllocation                    INTEGER    (0 . . 15),
        frequencyDomainAllocation               BIT STRING (SIZE(18)),
            antennaPort                         INTEGER    (0 . . 31),
            dmrs-SeqInitialization              INTEGER    (0 . . 1)
                    OPTIONAL, -- Cond NoTransformPrecoder
            precodingAndNumberOfLayers          INTEGER    (0 . . 63),
            srs-ResourceIndicator               INTEGER    (0 . . 15),
        mcsAndTBS                               INTEGER (0 . . 31),
        frequencyHoppingOffset                  INTEGER (1 . .
maxNrofPhysicalResourceBlocks-1)
                                                OPTIONAL, -- Need M
            pathlossReferenceIndex              INTEGER (0 . . maxNrofPUSCH-
PathlossReferenceRSs-1),
        . . .
    }
            OPTIONAL -- Need R
}
CG-UCI-OnPUSCH ::= CHOICE {
    dynamic                                     SEQUENCE (SIZE (1 . . 4)) OF BetaOffsets,
    semiStatic                                  BetaOffsets
}
-- TAG-CONFIGUREDGRANTCONFIG-STOP
-- ASN-LSTOP
```

The information in rrc-ConfiguredUplinkGrant is Type1-specific. For Type 2, corresponding information may be provided by a configured grant activation DCI. The activation DCI for configured grant may be scrambled with a Configured Scheduling-Radio Network Temporary Identifier (CS-RNTI). The activation DCI may be a L1 message dynamically scheduled on PDCCH in TTI level.

Wireless Connectivity Solutions for Industries

Advanced connectivity solutions are key to support the evolution of industries and their mission critical industrial activities as well as less critical communication needs. Some of the emerging technology tools and their applications are digital twins, smart workspaces, smart robots, virtual assistants. Examples of implementation technologies are virtual and augmented reality, data augmentation, additive manufacturing and IoT platforms.

The main drivers for wireless connectivity are:
Replacing or avoiding cables, which are costly to deploy and maintain/troubleshoot.
Connecting machines or parts of equipment that are impossible or impractical to connect by wire (e.g., fast-moving parts).
Preventive maintenance and big-data analytics, by connecting large numbers of sensors.

Furthermore, the industry expectation implementing 5G technologies within Operational Technologies is economy of scale.

Connectivity requirements for manufacturing use cases are diverse. A majority of the identified industry automation use cases are today connected through fixed industrial networks. Typical use cases in this area are motion control, robot control, production line and process control. The current wirelessly connected use cases are typically of less critical nature, such as e.g. monitoring and parametrization. In automotive factories the traffic mainly consists of real-time traffic, which is carried by protocols with highly-integrated protocol stack (e.g., Profinet Real-Time stack). The Transmission Control Protocol/Internet Protocol (TCP/IP) protocol stack is mainly used for carrying messages pertaining to startup configuration, notifications and non-critical alarm messages; with preventive monitoring, this type of traffic will increase. Hence connectivity requirements are very use case and application specific.

Traffic Characteristics

Latency is expected to be the dominating decision factor on whether a use case can be deployed using LTE or whether NR is required. Latency with a guaranteed upper bound is also very essential for critical automation use cases; packets need to arrive on time, otherwise they are considered lost. How well the upper-bound latency can be guaranteed is reflected by the reliability with which the UE is served, i.e. the percentage of the time during which packets are successfully delivered within the required latency bound.

Some industrial applications may be able to handle one or a few consecutive packets being lost, wherein the number of lost packets the application can handle may be referred to as a survival time. However, when exceeding a certain number of consecutive packets being lost, i.e. exceeding the survival time, the industrial application may go into a safety mode which may lead to a temporary production stop. End-to-end latencies for industrial applications may often be in the range of 1-100 ms, depending on the use case and application.

Due to the latency-sensitive nature of this kind of traffic even the smallest user plane interruptions may have a negative impact on the traffic as it may delay the packets beyond the guaranteed upper-bound latency required by the application.

Many critical automations use cases with traffic that has cyclic characteristics. A packet inter-arrival time (PIAT) may be periodic and predictable. The periodicity of the packet inter-arrival time and packet size is typically known. CG type 2 is a suitable uplink scheduling scheme to serve this type of traffic. That is because with semi-persistent scheduling based configured grant, the uplink transmission will potentially not need the scheduling request to inform the gNB about new data arrival and to request dynamic scheduling grant. Instead this may be done by configuring the periodicity of the configured grant, which may also be referred to as CG periodicity, to be the same as the PIAT and by assigning the grant size big enough to carry the packet size, and potentially other L1 and L2 information such as a Buffer Status Report (BSR), a Power Headroom Report (PHR), Hybrid automatic repeat request Acknowledgement/Non-Acknowledgement (HARQ A/N) and Channel state information (CSI). The latency may be improved as a scheduling request loop is not required.

The problem when supporting cyclic traffic transmission with the configured grant type 2 is that the packet arrival time is not known when the configured grant is activated with the activation DCI, though periodicity of the traffic may be configured. Therefore, as shown in FIG. 1, the packet arrival time may not be aligned with a configured grant activation time, even though the CG periodicity is aligned with PIAT. Hence, a delay (Tdelay) is introduced to a scheduling latency.

One way to reduce the Tdelay may be to overprovision an allocation for each UE so that the UE is granted e.g. in every possible transmission instance, regardless of what the industrial application's cycle time is. However, such a solution is not very spectrum efficient in case unique resources are to be allocated for each UE. It may further lead to a reduced reliability of the guaranteed latency in case many UEs are granted simultaneously and collisions occur.

A further solution may be to predict the packet arrival time on an initially over provisioned resource. After obtaining the packet arrival time, in order to save resource usage, the configured grant periodicity may be changed to be equal to the PIAT by means of RRC reconfiguration. RRC reconfiguration is however costly and will introduce a large delay to the on-going user plane transmissions. Therefore, such a solution is not feasible for delay and reliability critical C-MTC communication.

SUMMARY

The embodiments herein propose an efficient resource allocation scheme to support a group of UEs, such as critical machine-type communication (C-MTC) UEs, which have cyclic traffic characteristics with configured grant type 2.

The embodiments herein provide support for multiple critical MTC with cyclic traffic by using configured grant type 2 in a more spectrum efficient way. The embodiments herein provide a solution for how configured UL grant can be utilized to reduce latency without negatively impacting spectrum efficiency or reliability. For industrial traffic it is important to provide low guaranteed latency with a certain reliability, but spectrum efficiency is important to ensure that several critical devices can use the network simultaneously.

According to a first aspect of embodiments herein, the object is achieved by a method performed by a network node in a wireless communication system, for handling resource allocations for a first UE out of a set of UEs. Each of the UEs in the set of UEs has a different pre-configured frequency allocation for cyclic transmissions. The network node determines, based on a data arrival pattern of the cyclic UL transmissions for each of the UEs in the set of UEs, one or more TTIs, where a collision between transmissions to and/or from two UEs out of the set of UEs may occur. The network node reconfigures the frequency allocation for the first UE of the two UEs to overlap with the frequency of a second UE of the two UEs for the TTIs other than the TTIs where the collision between the transmissions to and/or from the first and the second UEs may occur.

According to a second aspect of embodiments herein, the object is achieved by a method performed by a first UE out of a set of UEs in a wireless communication system, for handling resource allocation for the first UE out of the set of UEs. Each of the UEs in the set of UEs has a different pre-configured frequency allocation for cyclic transmissions. The first UE receives, from the network node, a reconfiguration of the frequency allocation to overlap with the frequency of a second UE out of the set UEs for TTIs other than TTIs where a collision between transmissions to and/or from the first UE and the second UEs may occur. The first UE transmits the cyclic UL transmissions using the reconfigured frequency allocation received from the network node.

According to a third aspect of embodiments herein, the object is achieved by a network node in a wireless communication system, for handling resource allocations for a first UE out of a set of UEs. Each of the UEs in the set of UEs has a different pre-configured frequency allocation for cyclic transmissions. The network node is configured to determine, based on a data arrival pattern of the cyclic transmissions for each of the UEs in the set of UEs, one or more TTIs where a collision between transmissions from two UEs out of the set of UEs may occur. Reconfigure the frequency allocation for a first UE of the two UEs to overlap the frequency of a second UE of the two UEs for the TTIs other than the TTIs where the collision between the transmissions from the first and the second UEs may occur.

According to a fourth aspect of embodiments herein, the object is achieved by a first UE out of a set of UEs in a wireless communication system, for handling resource allocation for the first UE. Each of the UEs in the set of UEs has a different pre-configured frequency allocation for cyclic transmissions. The first UE is configured to receive a reconfiguration of the frequency allocation to overlap with the frequency of a second UE out of the set UEs for TTIs other than TTIs where a collision between transmissions from/to the first UE and the second UEs may occur. The first UE is further configured to transmit the cyclic transmissions using the reconfigured frequency allocation received from the network node.

The embodiments herein allow overprovisioning of resources in order to minimize an End-to-end (E2E) latency for the UE, but without negative impact on spectrum efficiency, system capacity and/or E2E service reliability.

Different from the prior art which tries to change SPS/ configured grant periodicity to match to the predicted packet arrival using RRC reconfiguration, the embodiments herein change the frequency allocation of the UEs to avoid potential allocation collision in frequency. Thus no RRC reconfiguration is needed, and thereby no extra delay is introduced into the telecommunication system.

Although the embodiments herein are described with a focus on frequency resources, the embodiments are however not limited to this. The embodiments herein may also be used to optimize usage of other resources, such as e.g. computer processing resources, etc.

BRIEF DESCRIPTION OF THE DRAWINGS

FIG. 17 is a schematic block diagram illustrating some second embodiments of the network node, FIG. 19 is a schematic block diagram illustrating some second embodiments of the UE.

FIG. 22 is a flowchart depicting methods implemented in a communication system including a host computer, a base station and a user equipment in accordance with some embodiments;

FIG. 23 is a flowchart depicting methods implemented in a communication system including a host computer, a base station and a user equipment in accordance with some embodiments;

DETAILED DESCRIPTION

Although the embodiments disclosed herein are described in the context of 3GPP NR radio technology it should be understood that the problems and solutions described herein are equally applicable to wireless access networks and UEs implementing other access technologies and standards. NR is used herein as an example technology for description due to easy understanding of the problem and solutions solving the problem. The embodiments herein may also be applicable for 3GPP LTE, or 3GPP LTE and NR integration, which may also be denoted as non-standalone NR.

Figure 1:
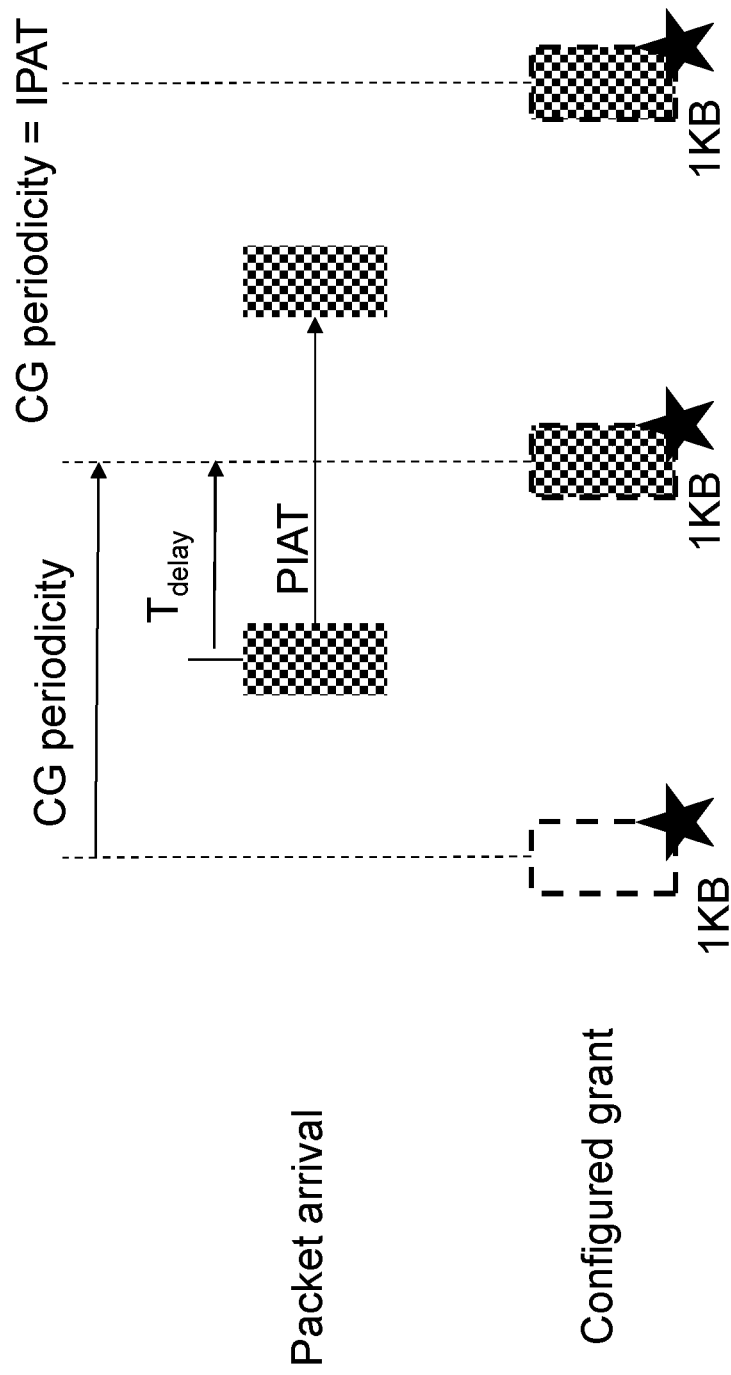
FIG. 1 is a schematic block diagram illustrating a packet arrival vs. configured grant for a cyclic transmission in a communications network.
Figure 2:
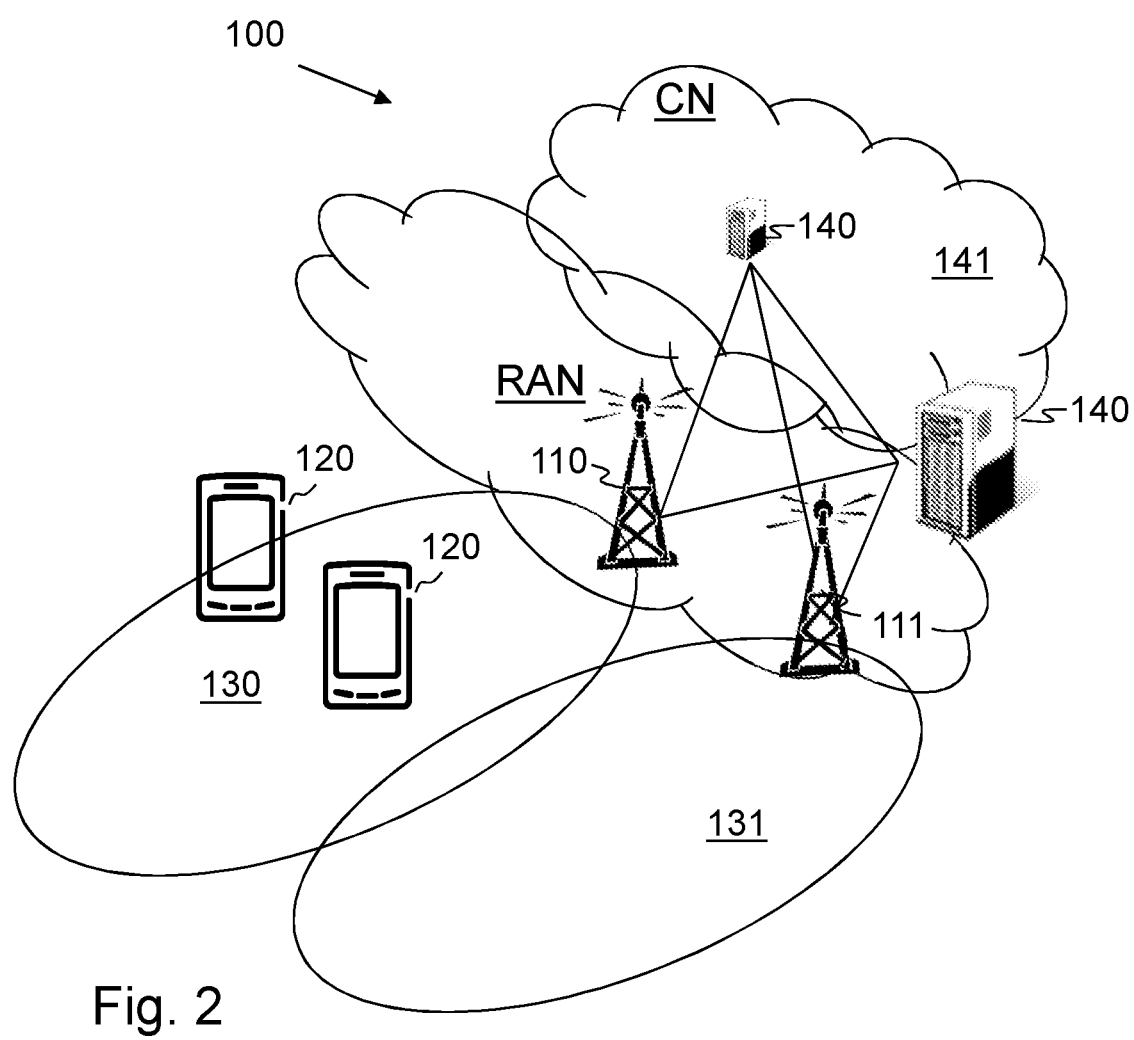
FIG. 2 illustrates embodiments of a wireless communications network.

FIG. 2 depicts an example of a communications network 100 according to a first scenario in which embodiments herein may be implemented. The communications network 100 is a wireless communication network such as e.g. an LTE, E-Utran, WCDMA, GSM network, any 3GPP cellular network, Wimax, or any cellular network or system.

The communications network 100 comprises a Radio Access Network (RAN) and a Core Network (CN). The communication network 100 may use a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), MuLTEfire, Worldwide Interoperability for Microwave Access (WiMax), Wi-Fi, or Ultra Mobile Broadband (UMB), just to mention a few possible implementations. In the communication network 100, a set of one or more UEs 120 may communicate via one or more Access Networks (AN), e.g. RAN, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets, industrial cellular gateway, industrial device, industrial modem or even a base station communicating within a cell.

The RAN comprises a set of radio network nodes, such as radio network nodes 110, 111 each providing radio coverage over one or more geographical areas, such as a cell 130, 131 of a radio access technology (RAT), such as 5G, LTE, UMTS, WI-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a gNB, a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The CN further comprises a core network node 140 which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 is located in the cell 130 of the network node 110, which is referred to as the serving cell, whereas the cell 131 of the network nodes 111 are referred to as neighboring cells. Although, the network node 110 in FIG. 2 is only depicted providing a serving cell 130, the network node 110 may further provide one or more neighboring cells 131 to the serving cell 130.

Note that although terminology from 3GPP 5G has been used in this disclosure to exemplify the embodiments herein, this should not be seen as limiting the scope of the embodiments herein to only the aforementioned system. Other wireless systems, including WCDMA, WiMax, UMB, GSM network, MuLTEfireany 3GPP cellular network or any cellular network or system, may also benefit from exploiting the ideas covered within this disclosure.

According to the embodiments herein, two UEs 120 are configured with a first set of resources and a first periodicity for transmitting on these resources. Based on the received transmissions on this first set of resources, the network node 110 may identify a potential collision. One of the UEs resources, i.e. the resources of one of the one or more UEs 120, may be dynamically allocated with L1 DCI command in TTI level to the second set of resources for the second of the two UEs without changing the periodicity.

In a detailed embodiment, said second set of resources is different from said first set of resources.

In the following, the embodiments herein will be described in further detail using configured grant in UL as an example. The same principle may however be equally applicable for DL SPS.

For ease of understanding, the embodiments herein are described with an example that there are two C-MTC UEs with cyclic traffic of same periodicity but with different packet arrival times. The two UEs 120 are hereinafter denoted as UE1, and UE2 in regards to the FIGS. 3 to 12. It shall be noted that the denotation UE1 and UE2 is only used to indicate that there are two different UEs 120 disclosed in these figures, it shall not be interpreted as the UEs having a certain internal order. Instead either of UE1 and UE2 may be selected as the first UE 120a or the second UE 120b according to the embodiments herein.

It shall be noted herein that TTI and slot or time slot may be used interchangeably and relate to a time and frequency resource in which a data block can be transmitted in UL or DL.

Step 1. A network node 110, such as e.g. the gNB or eNB, may overprovision the time allocation for both UEs 120. For example, to configure the configured grant periodicity of two UEs, CG_periodicity_UE1=CG_periodicity_UE2=1 slot. It shall be noted that the UE1 and UE2 may have different traffic transmission periodicity than the configured grant periodicity, and the PIAT of both UEs 120 may for example be every second slot while the configured grant periodicity may be configured to each slot. The periodicity of traffic inter-arrival time may be known by the network node 110, such as e.g. the gNB, since it may e.g. be configured as one parameter of a QoS Class Identifier (QCI/5QI) profile.

Figure 3:
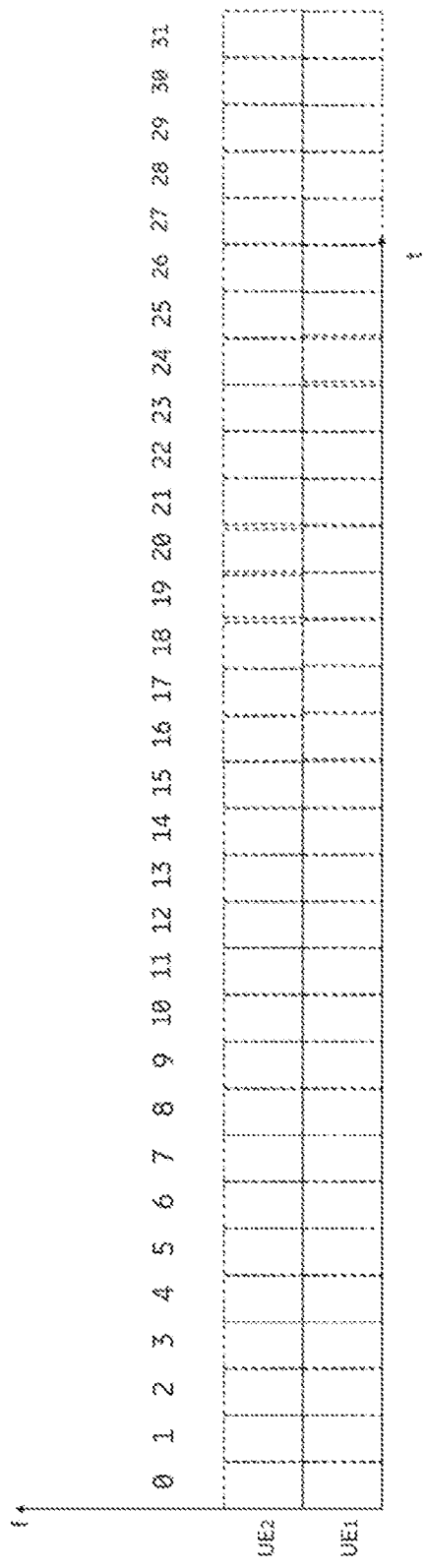
FIG. 3 depicts a time-frequency grid showing an over allocation of UEs with different time and frequency resources.

Step 2. The network node 110, may allocate different frequency resources for UE1 and UE2 so that they are not overlapping. The allocation may be started at a frequency allocation start point, such as e.g. at a frequency band edge, and the UE 120 to be allocated to the start frequency may be the UE 120 that has the lowest channel quality. The frequency allocation for the UEs 120 will not be changed in the following steps. The channel quality may be the estimated DL or UL channel quality. It may be based on a DL CQI report, a pathloss report, an uplink channel quality measurement, etc. For example, a first frequency (f1) may be allocated for UE1 and a second frequency (f2) may be allocated for UE2, as shown in FIG. 3. The allocation of the frequency resource in CG type 2 may be done via an L1 DCI message, which is less time consuming than the RRC signaling based allocation used for CG type 1

Figure 4:
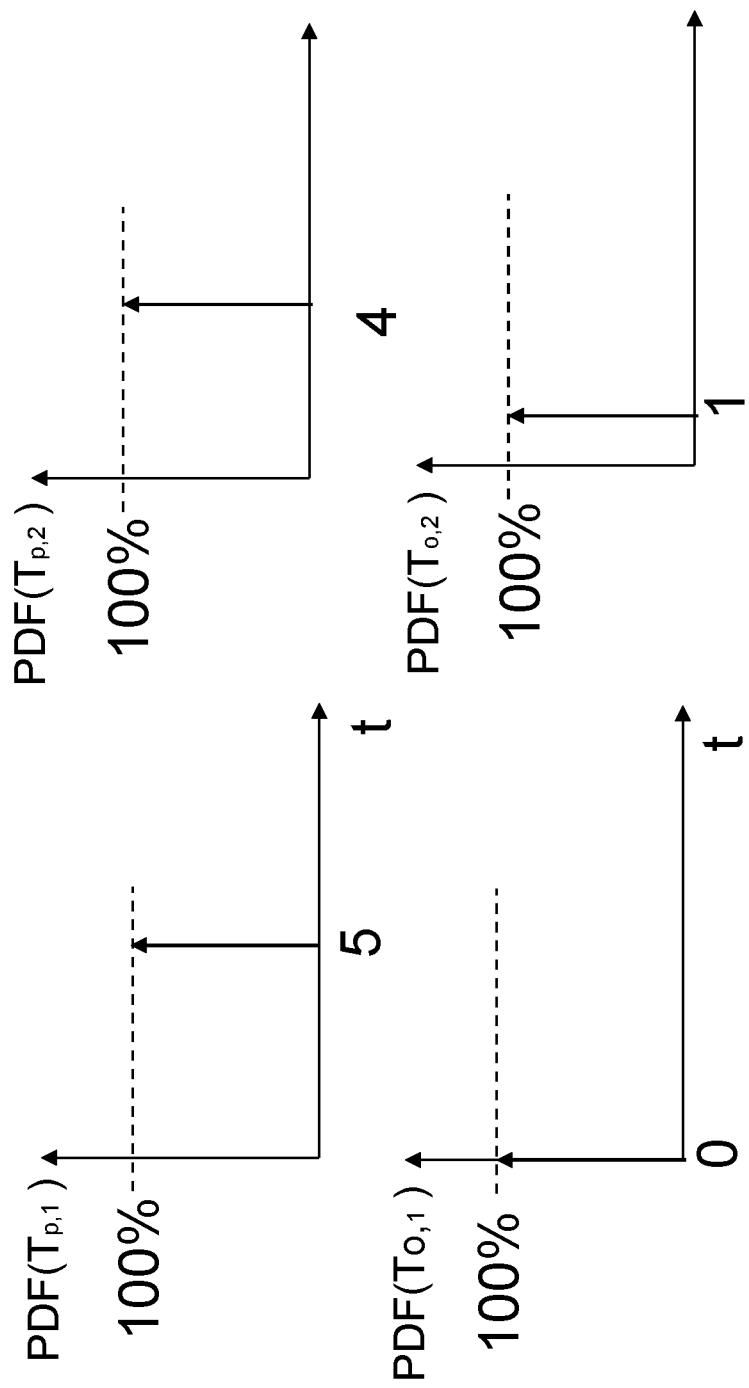
FIG. 4 illustrates a packet arrival prediction for two UEs having different periodicity and time offset.

Step 3. The network node 110, such as the gNB, may start receiving and/or transmitting the transmissions of both UEs 120, on f1 and f2 respectively. The network node 110 may detect that the packets from the two UEs 120, such as UE1 and UE2, will arrive at different times. The periodicity of the PIAT may also be detected by the network node 110. FIG. 4 shows a packet arrival prediction of UE1 and UE2 which comprises packet arrival periodicity Tp,n for UE n and time offset To,n for UE n. As shown in FIG. 4, the UE1 has the periodicity Tp,1=5, and the time offset To,1=0; whilst the UE2 has Tp,2=4 and To,2=1. The packet arrival prediction may be performed by the network node 110. The packet arrival time for a UE n will thus be:

$$Ta,n=Tp,n*k+To,n, k=0,1, \ldots K, K \in N$$

For the above example, the packet arrival time of UE1 will be Ta,1=5*k1; the packet arrival time of UE2 will be Ta,2=4*k2+1, where k=0,1, . . . . K, K∈N.

Step 4. For all UEs 120, the network node 110 may compute, which may also be referred to as determine, a time instance at which the transmissions from the UEs 120 might potentially collide based on the predicted packet arrival time.

In order to determine a potential collision the network node 110 may determine all time instances $t_1$ out of a set of time instances $T_1$ in which the UE1 may transmit and/or receive data packets in which the probability $P_1(t_1)$ of a packet to/from UE1 arriving is larger than a first threshold x. The network node 110 may further determine all time instances $t_2$ out of a set of time instances $T_2$ in which the UE2 may transmit and/or receive data packets in which the probability $P_2(t_2)$ of a packet to/from UE2 arriving is larger than a first threshold y. If the determined time instances $t_1$ and $t_2$ are the same, a collision between data packets transmitted at this time instance will occur.

In other $P_1(t1)$ Collision is determined as:
$t_1$=find all $t_1$ belonging to $T_1$ that satisfies $P_1(t_1)>x$,
$t_2$=find all $t_2$ belonging to $T_2$ that satisfies $P_2(t_2)>y$,
wherein:
$P_1(t)$ is the probability of a packet to/from UE1 arriving at time instance t,
$P_2(t)$ is the probability of a packet to/from UE2 arriving at time instance t,
$T_1$ is the set of time instances in which UE1 may transmit and/or receive,
$T_2$ the set of time instances in which UE2 may transmit and/or receive,
$T_1$ and $T_2$ might overlap, or might be the same or different. If $T_1$ and $T_2$ does not overlap, there will be no collision between UE1 and UE2. If both UE1 and UE2 are using URLLC traffic, the first and second thresholds may be set to zero, i.e. x=y=0, in order to secure reliability of transmission for the URLLC traffic.

If $t_1=t_2$ a packet sent to/from UE1 and a packet sent to/from UE2 will collide at $t_{collision}=t_1=t_2$ For the above example shown in FIG. 4, with two UEs 120, such as e.g. UE1 and UE2, the potential collision occurs at the time instance when Ta,1=Ta,2. In other words, the collision may occur when 4*k2+1=5*k1. As long as UE1 and UE2 are scheduled on different frequencies no collision will occur. However since the packet arrival time of the two UEs is the same at some instances, a collision may occur if UE1 and UE 2 use the same frequency and both transmit at the time instance where the packet arrival time is the same.

Both k1 and k2 are integer. The collision may thus occur with the following combination: {k1=1,k2=1}; {k1=5, k2=6}, . . . See FIG. 5.

Figure 5:
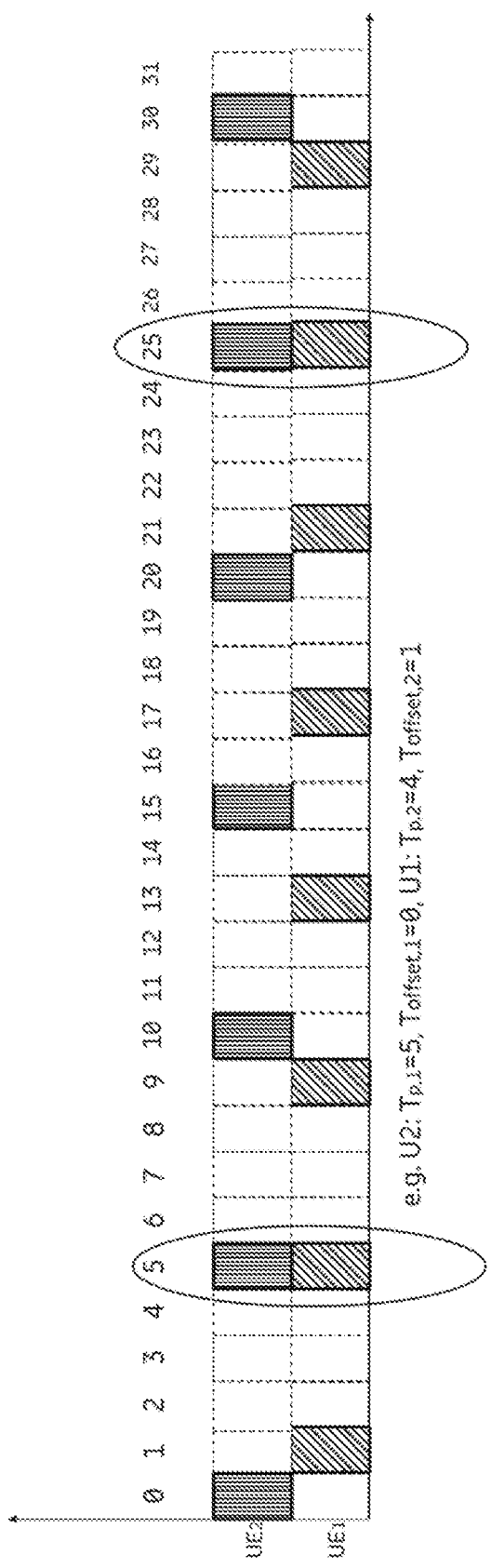
FIG. 5 depicts a time-frequency grid for two UEs with cyclic traffic having different periodicity and time offset potentially causing a collision of UL transmissions.

FIG. 5 shows examples of two C-MTC UEs 120 with cyclic traffic, UE1 and UE2. UE1 and UE2 have different periodicity and time offset and may potentially collide at slot 5, 25 . . .

Figure 6:
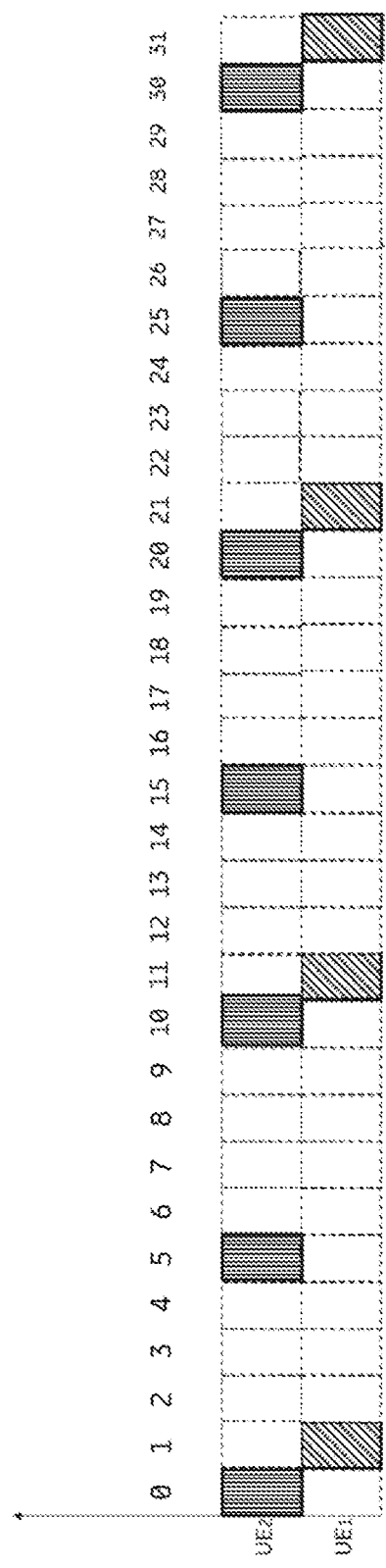
FIG. 6 depicts a time-frequency grid for two UEs with cyclic traffic having different periodicity and time offset potentially never causing a collision of UL transmissions.

In some scenarios, when the UEs 120 have periodicities that are equal or with an integer factor, and the time offsets are different, the transmissions will never collide. Such a scenario is disclosed in FIG. 6. In FIG. 6, UE1 has the packet arrival time ta,1=10*k1+1, and UE2 has the packet arrival time ta,2=5*k2. The transmissions of the two UE1 and UE2 will never collide.

Step 5. For all of the C-MTC UEs, if there are transmissions that do not collide, the network node 110 or a scheduler in the network node 110, such as e.g. a gNB scheduler, may reallocate the spectrum to be more efficient. The gNB may have a sliding window which is moving over time and processes are performed within the sliding window. It may follow the following steps.

5.1 The network node 110 may select the UE 120 of the two UEs 120 with a higher channel quality to reallocate the spectrum for. The selected UE may herein also be referred to as a first UE 120a. The channel quality may be determined based on the DL CQI report or pathloss. It may also be determined based on UL measurement. By selecting the UE 120 having the higher or highest channel quality based on a DL channel quality estimate, a high reliability of the L1 DCI reactivation command to move the frequency allocation may be ensured. In this example, we assume that UE2 is selected, as it has a higher channel quality, such as a Signal-to-Interference-and-Noise Ratio (SINR). The channel quality may be the downlink channel quality. It may thereby be ensured that the activation DCI or the dynamic scheduling DCI is sent with good reliability. In some embodiments the network node 110 may also select and/or determine to reallocate the spectrum for the UE 120 having the lower priority of the two UEs, instead of the UE having the higher channel quality.

5.2 The network node 110 may determine a new frequency resource for the selected UE, which in the scenario shown in FIG. 6 is referred to as UE2. For the time instance where the transmission of UE1 and UE2 do not collide, the network node 110 may set the frequency of the PRB allocation for UE2 equal to f1, where f1 is the frequency of the PRB used for UE1. For the time instance where the transmissions of UE1 and UE2 collide in time, the network node 110 may not change the frequency allocation for UE2, for these time instances the UE2 will still be using the PRB for f2.

Figure 7:
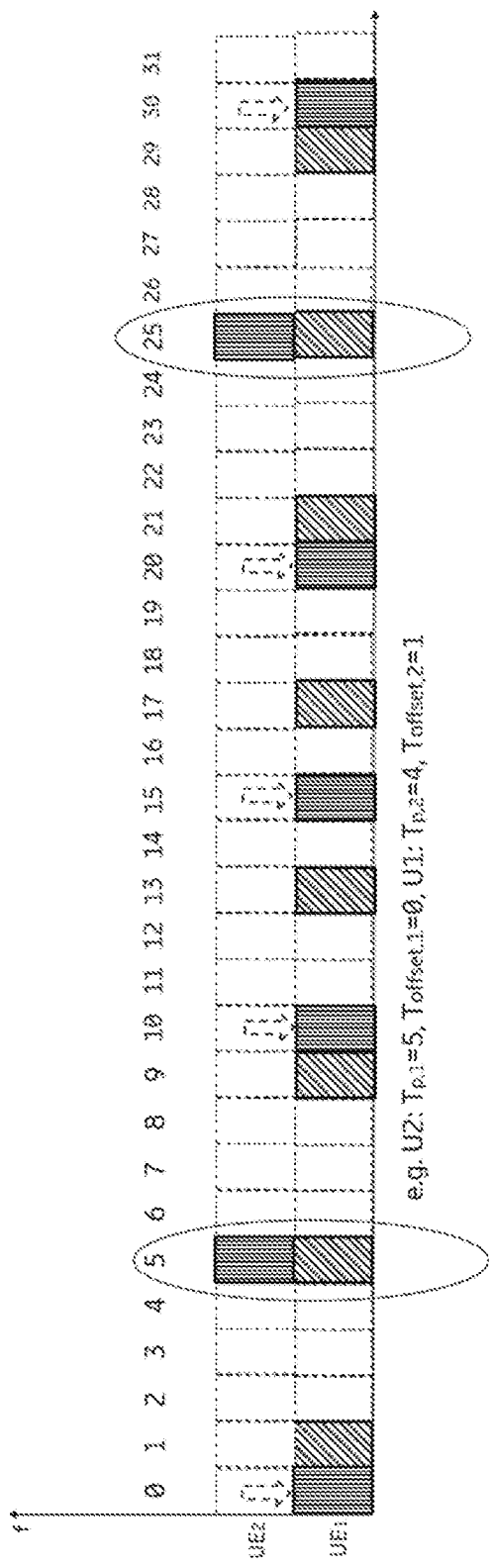
FIG. 7 depicts a time-frequency grid for two UEs with cyclic traffic having different periodicity and time offset where the frequency allocation of a first UE has been adapted according to a first embodiment herein.

FIG. 7 shows the spectrum usage after step 5. The frequency of the selected UE2 is changed to be equal to the frequency of UE1 at the time when there is no collision; the initial frequency allocation of the selected UE2 is maintained, i.e. equal to f2, at the time instances when both UE1 and UE2 are transmitting and the transmissions from UE1 and UE2 are colliding in time, e.g. at slot 5 and 25.

Step 6. The network node 110 may use a L1 DCI activation command and/or a dynamic grant to inform the selected UE 120 to change its frequency allocation.

6.1 If there is no collision between two of the UEs 120, such as between the UE1 and UE2 according to the example shown in FIG. 6, the L1 DCI activation command may be sent from the network node 110 to the selected UE 120, in this case UE2, with the PRB allocation changed from frequency f2 to f1.

6.2 If there is collision between the transmissions of the two UEs 120, but the number of collisions is much fewer than the number of time instances where no collision occurs, in order to save L1 signaling overhead, the network node 110 may send the DCI activation command with updated frequency allocation from f2 to f1 for the selected UE, in this case UE2. Then, at the expected granting time of the collision TTI, the network node may issue a dynamic grant to move the frequency allocation of the selected UE 120, in this case UE2, from f1 back to f2. The dynamic grant may only be valid for one transmission.

Figure 8:
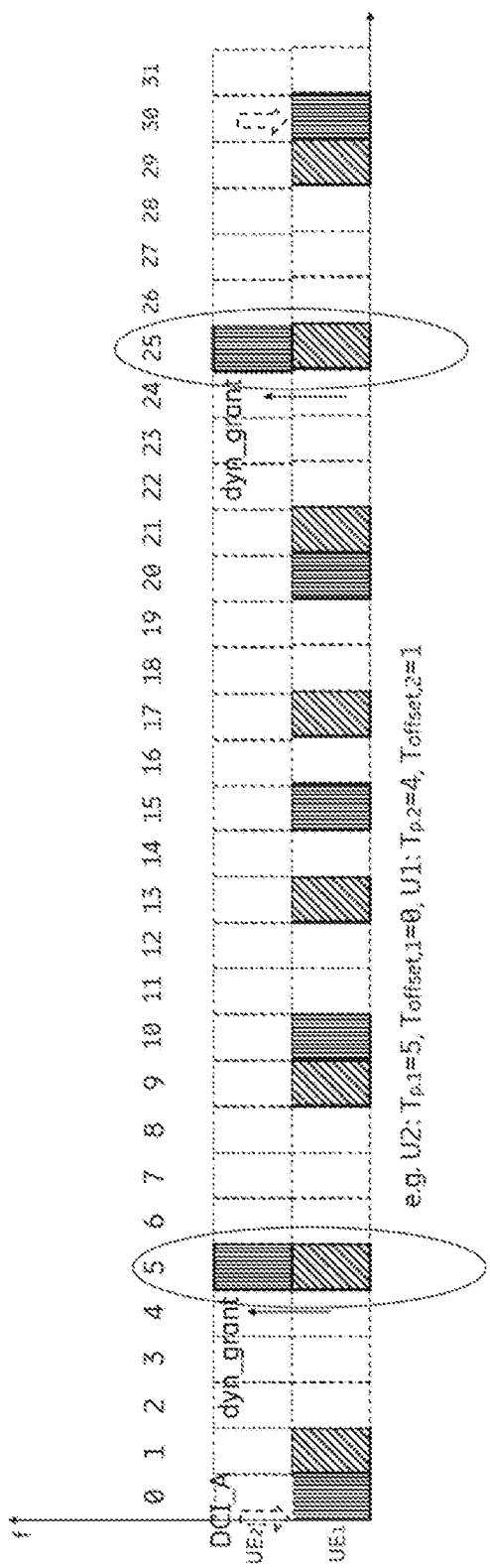
FIG. 8 depicts a time-frequency grid for two UEs with cyclic traffic having different periodicity and time offset where the frequency allocation of a first UE has been adapted according to a second embodiment herein.

As shown in FIG. 8, the DCI activation command may be signaled to the UE2, which indicates to UE2 to change the PRB allocation from f2 to f1. A dynamic grant may be issued to the UE2 for the transmission at slot 5 and slot 25, when collision might occur between UE1 and UE2, in order to change back to the previous frequency allocation, in this case from f1 to f2. Only 2 Physical Downlink Control Channel (PDCCH) grant resources, one for the activation command of all the SPS transmission time instances and one for the dynamic grant at collision transmission instances, is needed in one cycle.

Furthermore, it may also be possible to use a DCI activation command to change the allocation of a specific UE 120 with a defined periodicity. For the example disclosed in FIG. 8, the network node 110 may issue an activation DCI with f2=f1 for a periodicity every 5 TTI. The network node 110 may then issue another activation command to change the allocation of the UE 120, in this case UE2, from f1 to f2 at the time instances of potential collision with periodicity every 10 ms. Only two PDCCHs will thereby be needed in the entire traffic. Thereby, L1 signaling overhead may be further reduced.

6.3 If there are a lot of instances where collisions between the transmissions of one or more UEs may occur, for example when the number of collisions is much larger than the time instances without collisions, a dynamic grant may be used to update the frequency allocation of the selected UE at the time instance where no collision occurs.

Regardless of the periodicity and/or cycle time, an industry may have some UEs which are communicating at the same time and some which are not. The embodiments herein may thus be used to optimize the resource sharing among the users with cyclic traffic that can be separated in time. Thereby a higher number of UEs may be served with the same amount of resources, while avoiding collisions. Furthermore, the embodiments herein are described with an example for configured grant type 2 resource allocation where the frequency resource is allocated with an activation DCI, which is much faster than the RRC signaling based configured grant type 1. However, the embodiments herein are not limited to be used only for configured grant type 2 to support C-MTC, but may also be used for configured grant type 1 for other traffic use case where latency requirement is not critical. In these case, the change of allocation for repacking the unused spectrum may be based on dynamic grant. The embodiments herein may also be used to support cyclic traffic for DL SPS to reallocate frequency resources for non-colliding time instances.

Figure 9:
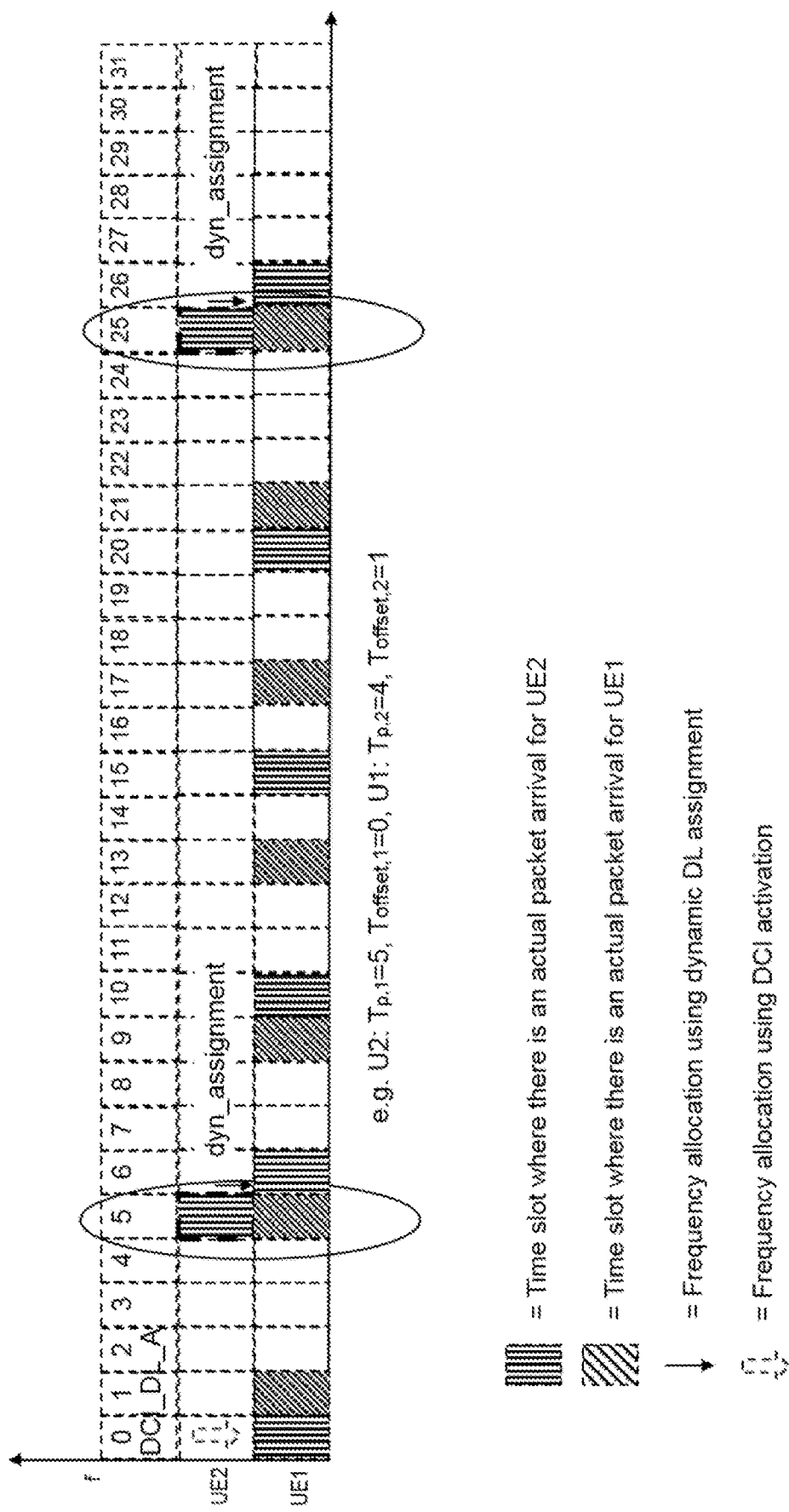
FIG. 9 depicts a time-frequency grid for two UEs with cyclic traffic having different periodicity and time offset where the frequency allocation of a first UE has been adapted according to a third embodiment herein.

FIG. 9 illustrates a scenario where UE1 sends an UL transmission and UE2 receives a DL transmission. According to the scenario shown in FIG. 9 the UL transmission from UE1 will collide with the DL transmission to UE2 in slots 5 and 25. In order to optimize the resource sharing between the two UEs, the network node 110 may send a DL DCI activation (DCI-DL-A) command to change the frequency allocation of the DL packets transmitted to UE2 so that the frequency is equal to the frequency of the UL transmissions from UE1. At the time of collision, in other words for the slots where the collision would occur, the network node 110 may stop transmitting DL transmission to UE2 and may receive the UL transmission from UE1 instead. After the time of collision, at the first time instance when there is no collision, the network node 110 may issue a DL dynamic assignment on the PDCCH to DL data transmission at the PDSCH. In other words the network node 110 may hold the DL transmission which was scheduled in a slot where collision between the DL transmission to UE2 and the UL transmission from UE1 would have occurred and may transmit the DL packet to the UE2 on the frequency of UE1 in one of the subsequent available slots.

In some scenarios the packet arrival time and/or periodicity for one or more of the UEs 120 may suffer from jitter. In other words the data packet may arrive prior to the scheduled time or after the scheduled time. There may also be other be uncertainties with regards to the packet arrival time prediction. In the example shown in FIG. 10 the packet arrival periodicity $T_{p,2}$ of UE2 experiences a jitter. 80% of the time the packet arrives with a periodicity of 5 slots, but the periodicity may sometimes be 4 slots, and sometimes 6 slots.

Figure 10:
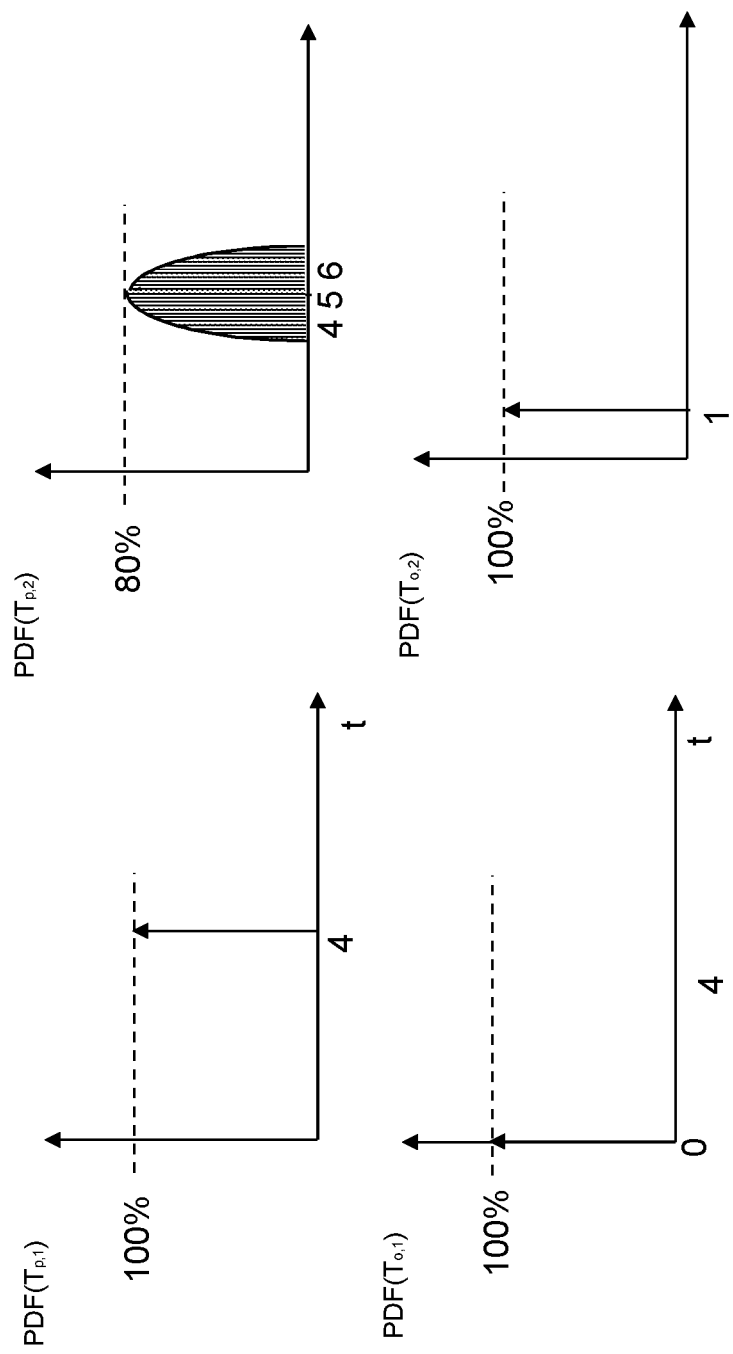
FIG. 10 illustrates a packet arrival prediction for two UEs having different periodicity and time offset, wherein one of the packet arrival predictions suffers from jitter.
Figure 11:
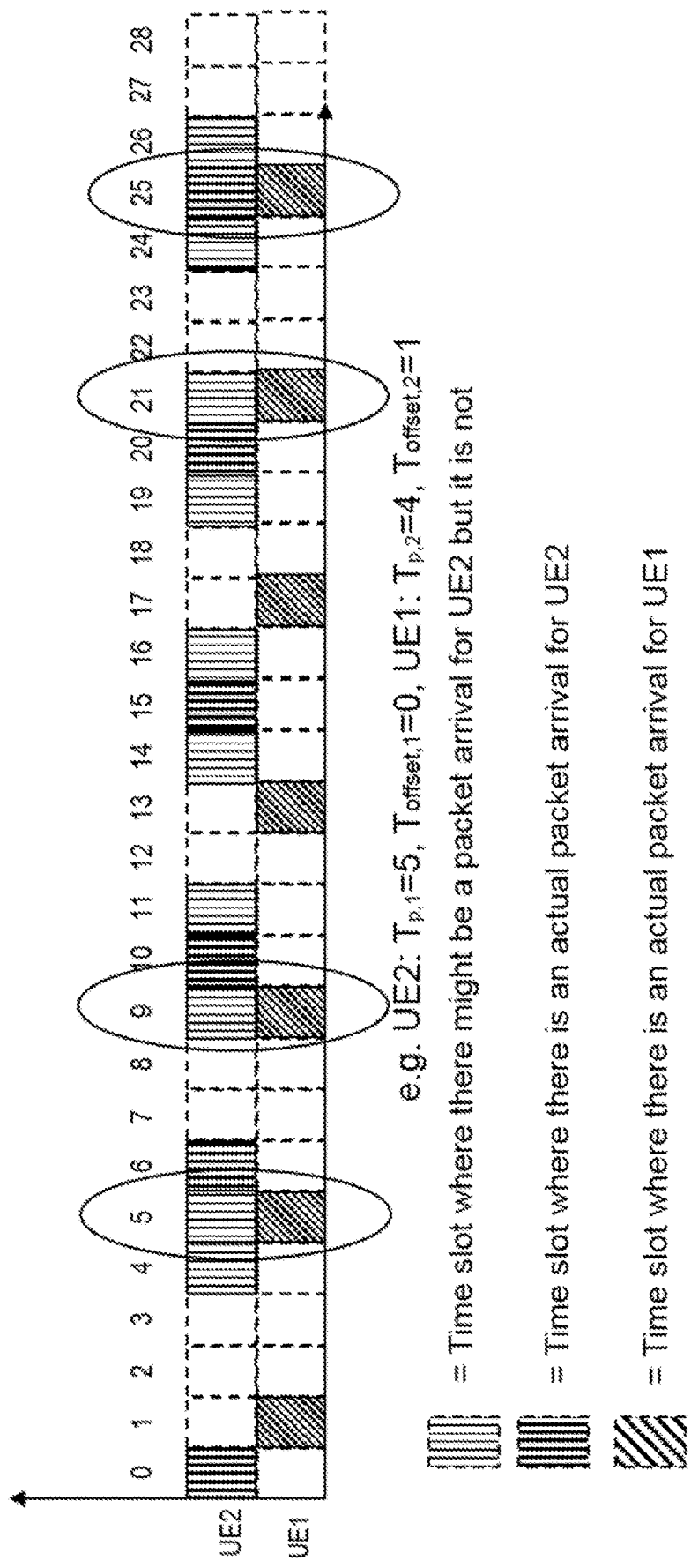
FIG. 11 depicts a time-frequency grid for two UEs with cyclic traffic having different periodicity and time offset according to a fourth embodiment herein in which the prediction of the packet arrival time suffers from jitter.

FIG. 11 shows the time and frequency allocations of the two UEs UE1 and UE2 for the scenario depicted in FIG. 10 in which the packet arrival to or from UE2 suffers from jitter. The slots marked with light vertical lines are time slots, such as TTIs, in which there might be a packet arrival due to jitter but no packet arrives. The slots with dark vertical lines on the other hand are the actual packet arrival times for the data packets transmitted to or from the UE2. A potential collision is identified and may occur in slots 5, 9 21 and 25. These slots are marked with the ovals. The collision may be identified when the packet arrival, determined based on the periodicity and offset of the data packet transmissions, for both of the UEs for a specific time slot have a probability >0.

Figure 12:
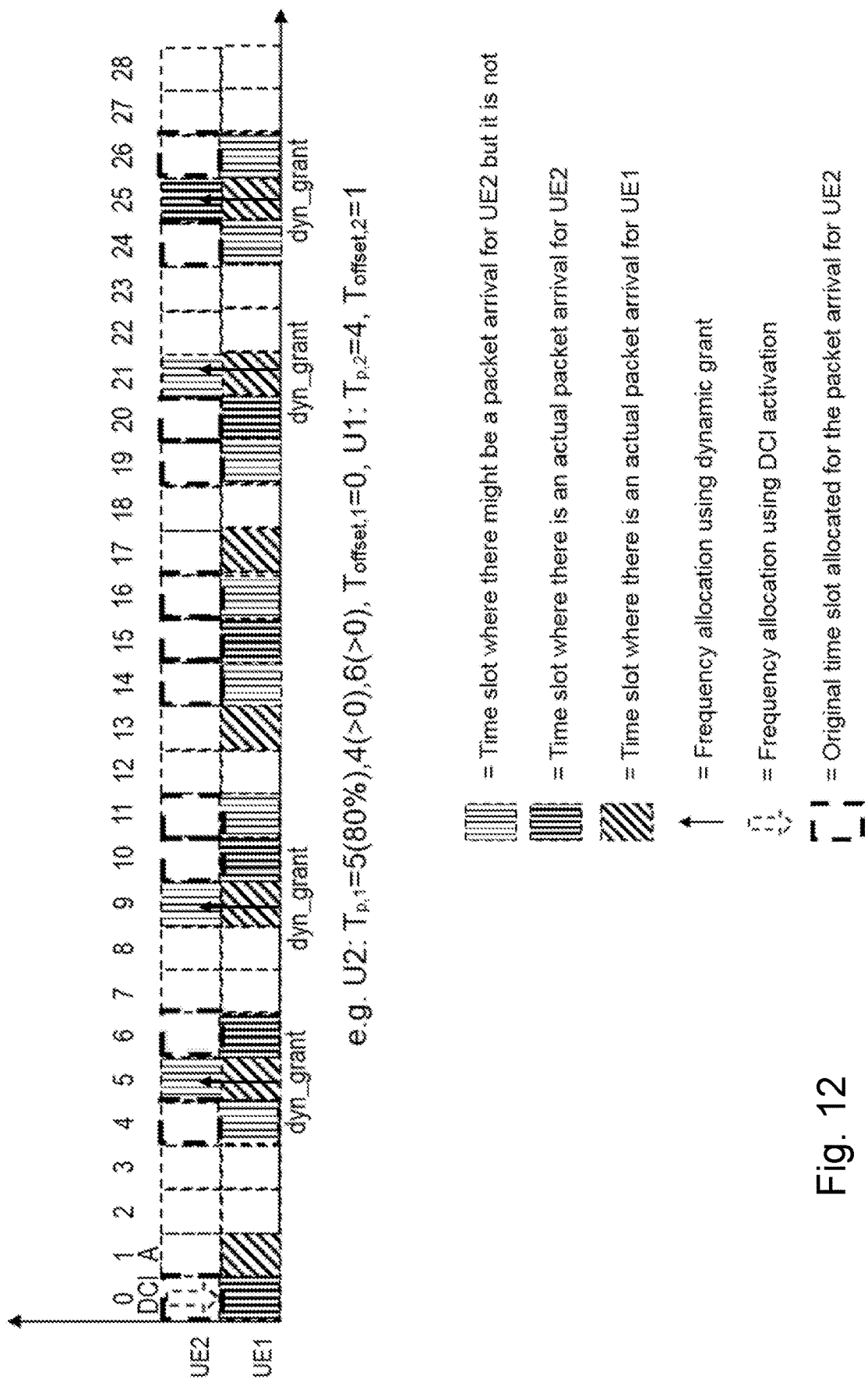
FIG. 12 depicts a time-frequency grid for two UEs with cyclic traffic having different periodicity and time offset where the frequency allocation of a first UE has been adapted, according to a fourth embodiment herein in which the prediction of the packet arrival time suffers from jitter.

FIG. 12 illustrates an embodiment herein for handling the uncertainty relating to jitter as described in relation to FIGS. 10 and 11. In order to optimize the resource sharing the network node 110 may determine a first UE 120*a* out of the two UEs 120 for which the frequency spectrum shall be reallocated. In the scenario depicted in FIG. 12 the UE2 is selected as the first UE 120*a*, e.g. based on DL channel quality. The network node 110 may move the frequency allocation for the first UE 120*a*, in this case UE2, to the frequency allocation for the second UE 120*b*, in this case UE1, for the time and/or time slots when packet arrival probability >0, e.g. using DCI activation. The network node 110 may further move the frequency of the transmissions related to the first UE 120*a* back to the previous frequency of the first UE 120*a* for the time and/or time slots for which a collision between the data transmission related to the second UE 120*b*, in this case for slots 5, 9, 21 and 25. This move may e.g. be performed using dynamic DCI.

Figure 13:
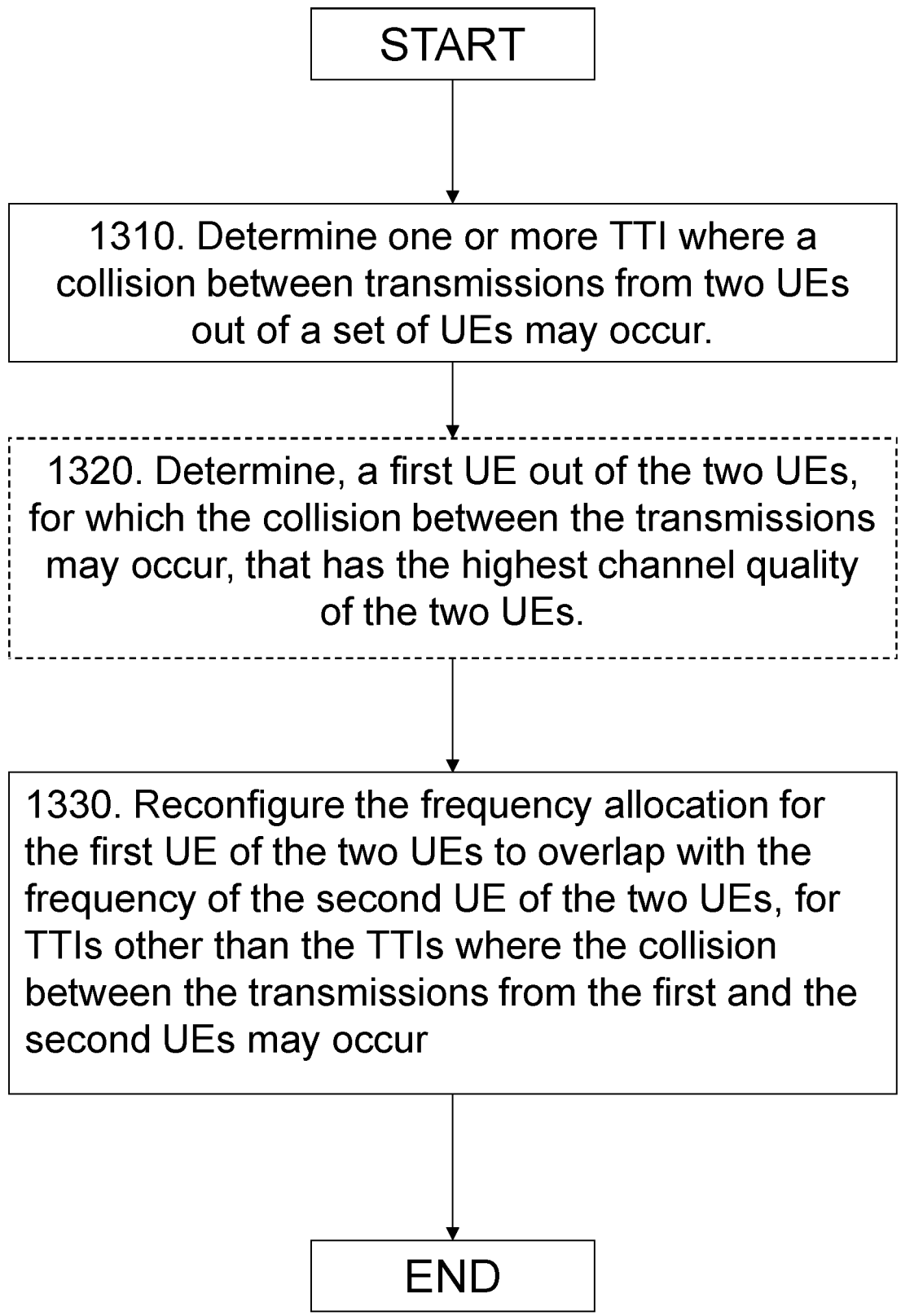
FIG. 13 is a flowchart depicting a method performed by a network node according to embodiments herein.

FIG. 13 illustrates the method actions performed by the network node 110, in the wireless communication system 100, for handling resource allocations for a first UE 120*a* out of a set of UEs 120. Each of the UEs 120 in the set of UEs 120 has a different frequency allocation for cyclic transmissions, such as cyclic UL and/or DL transmissions.

The set of UEs 120 may e.g. have been pre-configured with the different frequency allocations for cyclic transmissions, e.g. using SPS. The frequency allocation may be pre-configured for certain or all TTIs for each UE. The scheduling may overprovision the time allocation for the UEs 120. The wireless communication system may e.g. be an LTE system or a 5G system Action 1310: The network node 110 may determine one or more TTI where a collision between UL transmissions from two UEs 120 out of the set of UEs 120 may occur, based on the data arrival pattern, such as e.g. a packet arrival time, of the cyclic transmissions, such as cyclic UL and/or DL transmissions, for each of the UEs in the set of UEs 120. In some embodiments, a certain time and frequency resource, such as a TTI, may be shared between uplink and downlink transmission. The collision might occur between two UEs that have data from different directions arriving at buffer at the same time. The first UE 120a may e.g. receive transmissions in the DL while the second UE 120b transmits in the UL. This action 1310 corresponds to step 4 described above.

Action 1320: The network node 110 may determine a first UE 120a out of the two UEs 120, for which the collision between the UL transmissions or UL&DL or two DL transmissions may occur, which first UE 120a has the highest channel quality of the two UEs. The first UE 120a may then be selected as the UE 120 that the spectrum should be reallocated for. In other words the network node 110 may determine the UE 120 with the highest channel quality of the two UEs 120 for which a collision of UL transmissions may occur to reallocate the spectrum for. The channel quality may be determined based on the DL CQI report or pathloss. It may also be determined based on UL measurement. By selecting the UE having the higher or highest channel quality based on a DL channel quality estimate, a high reliability of the L1 DCI reactivation command to move the frequency allocation may be ensured. In the example described above, the first UE 120a corresponds to UE 2 which is selected, as it has a higher channel quality SINR. This action 820 is similar to step 5.1 as described above.

In some embodiments the network node 110 may also select and/or determine to reallocate the spectrum for the UE 120 having the lower priority of the two UEs, instead of the UE 120 having the higher channel quality.

Action 1330: The network node 110 may reconfigure the frequency allocation for the first UE 120a of the two UEs 120 to overlap with the frequency of the second UE 120b of the two UEs 120 for the TTIs other than the TTIs where the collision between the UL transmissions from the first and the second UEs 120a, 120b may occur. In other words the frequency allocation for the first UE 120a may be changed to overlap, at least partly, with the frequency of the second UE 120b for the TTIs, which may also be referred to as time instances, where no collision between UL and/or DL transmissions occur. This is similar to step 5.2 described above. At least partly shall herein be interpreted as for all TTIs where no collision occurs between the first and the second UE 120a, 120b. For the TTIs where a collision occurs the frequency allocations for the two UEs will not overlap.

In a first embodiment, the network node 110 may reconfigure the frequency allocation of the first UE 120a by sending a DCI message to the first UE 120a. The DCI message may comprise an updated frequency allocation for the TTIs other than the TTIs in which the collision between the UL and/or DL transmissions from and/or to the first and second UEs 120a, 120b may occur. The TTIs other than the TTIs in which the collision between the UL and/or DL transmissions from and/or to the first and second UEs 120a, 120b may occur, shall be understood as the TTIs in which no collision occurs. The updated frequency allocation may change the frequency allocation of the first UE 120a to overlap, at least partly, with the frequency allocation of the second UE 120b. The DCI message may be a DCI based activation command, such as a DCI reactivation command, an activation DCI or a dynamic scheduling DCI. This first embodiment of action 830 is similar to step 6.1 described above.

In a second embodiment, the network node 110 may reconfigure the frequency allocation of the first UE 120a by sending a DCI message to the first UE 120a out of the two UEs 120. The DCI message comprises an updated frequency allocation to overlap, at least partly, with the frequency of the second UE 120b for all TTIs. If both transmissions are from the same direction, such as e.g. UL, the network node 110 may further issue a dynamic grant to move the frequency allocation for the first UE 120a from the frequency of the second UE 120b to the previous frequency allocation of the first UE 120a for the TTIs where the collision between the UL transmissions from the first and second UE 120a, 120b may occur. This second embodiment of action 830 corresponds to step 6.2 described above. If one of the colliding transmissions is a DL transmission, the network node 110 may according to one embodiment reconfigure the frequency allocation for the first UE 120a out of the set of UEs 120 by refraining from transmitting the DL transmission at the colliding time instance and issuing a dynamic assignment to schedule the DL transmission, such as a DL PDSCH transmission, at the first available time instance, such as a TTI, where there is no colliding UL or DL transmission. In some embodiments this may be done if the UE transmitting in UL has priority and/or has tighter latency requirement. When the UE transmitting in the UL has higher priority and/or tighter latency requirement the DL UE will be selected as the first UE 120a having the frequency allocation reconfigured, which may also be referred to as holding In a third embodiment, the network node 110 may reconfigure the frequency allocation of the first UE 120a by issuing a dynamic grant to move the frequency allocation for the first UE 120a to overlap, at least partly, with the frequency of the second UE 120b for the TTIs other than the TTIs in which the collision between the UL transmissions from the first and second UEs 120a, 120b may occur. This third embodiment of action 830 corresponds to the step 6.3 described above.

If both of the UEs 120 are receiving DL transmissions, then the network node will transmit the DL transmissions to the first and second UEs 120a, 120b by transmitting them with overlapping frequency allocations for all time instances, such as TTIs, except the time instances in which a collision occurs. For these time instances the network node 110 will change, which may also be referred to as reconfigure, the frequency allocation for the DL transmission to the first UE 120a out of the set of UEs 120, to a frequency which does not correspond to the frequency allocation of the second UE 120b out of the set of UEs 120. This change of frequency allocation may be performed in accordance with any of the embodiments disclosed herein.

Figure 14:
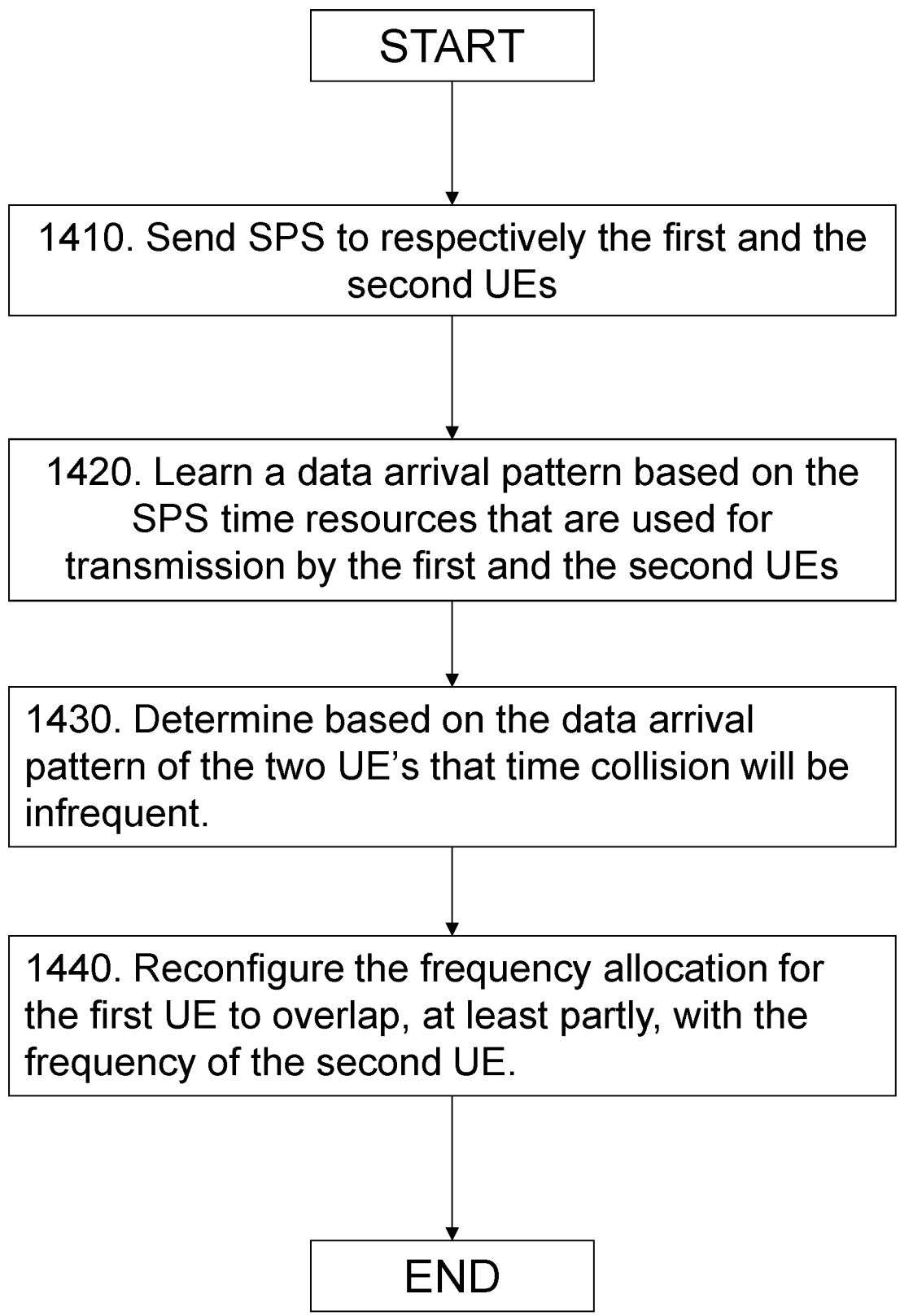
FIG. 14 is a flowchart depicting a further method performed by the network node according to embodiments herein.

An alternative set of method actions performed by the network node 110, in the wireless communication system 100, for handling resource allocations for a first UE 120a out of a set of UEs 120 shall now be described. This alternative set of actions is shown in FIG. 14.

Action 1410: The network node 110 may send a Semi Persistent Scheduling, SPS, to respectively the first and the second UEs 120a, 120b. The SPS allocates different frequency resources for each UE 120*a*, 120*b* and overprovisions time resources as compared to an expected need of each of the UEs 120*a*, 120*b*.

Action 1420: The network node 110 may learn a data arrival pattern based on the SPS time resources that are used for transmission by the first and the second UEs 120*a*, 120*b*. Learning the data arrival pattern shall herein be interpreted as the network node 110 determining the data arrival pattern or obtaining the data arrival pattern from a different source.

Action 1430: The network node 110 may determine based on the data arrival pattern of the two UE's 120*a*, 120*b* that time collision will be infrequent.

Action 1440: The network node 110 may reconfigure the frequency allocation for the first UE 120*a* to overlap, at least partly, with the frequency of the second UE 120*b*. This action 1440 corresponds to the action 1340 described in relation to FIG. 13.

The network node 110 may e.g. reconfigure the frequency allocation by sending a DCI message to the first UE 120*a*, wherein the DCI message comprises an updated frequency allocation.

Figure 15:
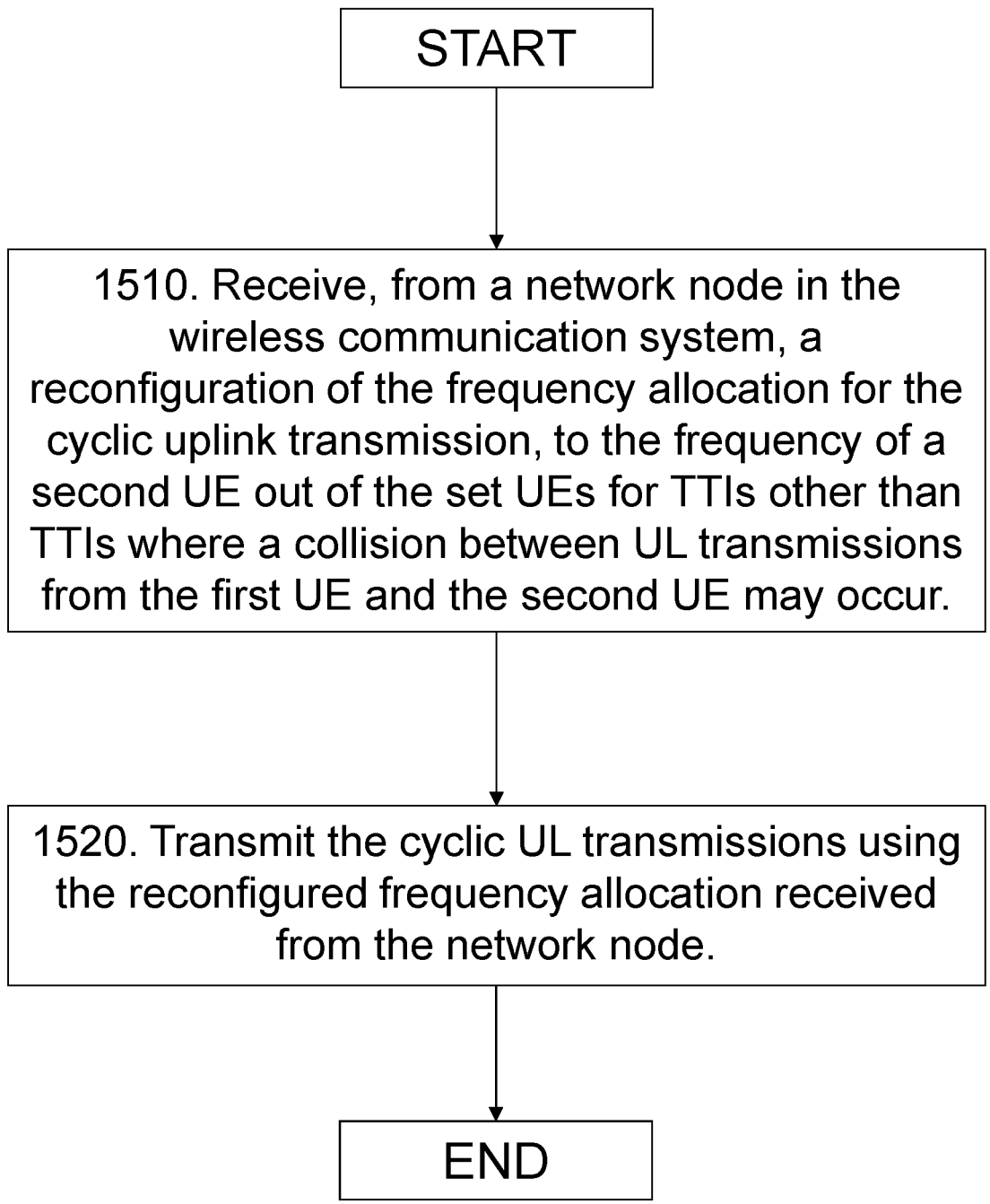
FIG. 15 is a flowchart depicting a method performed by a UE according to embodiments herein.

FIG. 15 illustrates the method actions performed by a first UE 120*a* out of a set of UEs 120 in a wireless communication system 100, for handling resource allocation for the first UE 120*a* out of the set of UEs 120. Each of the UEs 120 in the set of UEs has a different pre-configured frequency allocation for cyclic transmissions, such as cyclic UL and/or DL transmissions.

Action 1510: The UE 120 may receive, from the network node 110, a reconfiguration of the frequency allocation for the cyclic uplink transmission to overlap, at least partly, with the frequency of a second UE 120*b* out of the set UEs 120 for TTIs other than TTIs where a collision between transmissions to and/or from the first UE 120*a* and the second UE 120*b* may occur.

In a first embodiment, the first UE 120*a* may receive the DCI message from the network node 110, wherein the DCI message comprises an updated frequency allocation for the TTIs other than the TTIs in which the collision between the transmissions to and/or from the first UE 120*a* and the second UE 120*b* may occur. This first embodiment of action 1510 is similar to step 6.1 described above.

In a second embodiment, the first UE 120*a* may receive the DCI message from the network node 110, wherein the DCI message comprises an updated frequency allocation to overlap, at least partly, with the frequency of the second UE 120*b* for all TTIs. The first UE 120*a* may further receive a dynamic grant to change the frequency allocation to the previous frequency allocation of the first UE 120*a*, for the TTIs where the collision between the transmissions to and/or from the first UE 120*a* and the second UE 120*b* may occur. This second embodiment of action 1510 corresponds to step 6.2 described above.

In a third embodiment, the first UE 120*a* may receive a dynamic grant to change the frequency allocation to overlap, at least partly, with the frequency of the second UE 120*b* for the TTIs other than the TTIs in which a collision between the transmissions to and/or from the first UE 120*a* and the second UE 120*b* may occur. This third embodiment of action 1510 corresponds to the step 6.3 described above.

Action 1520: The UE 120 may transmit the cyclic transmissions using the reconfigured frequency allocation received from the network node 110.

Figure 16:
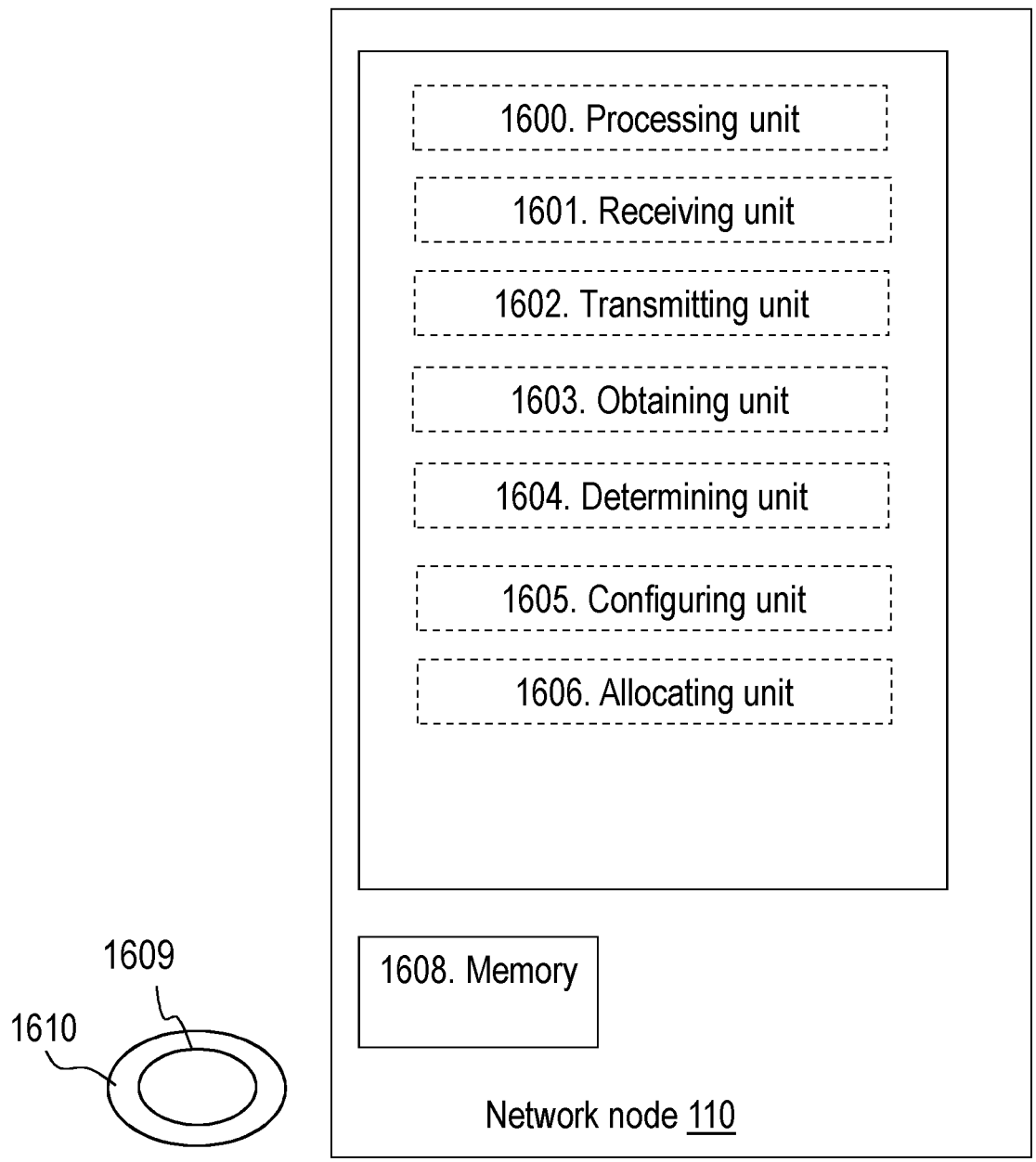
FIG. 16 is a schematic block diagram illustrating some first embodiments of a network node.

FIG. 16 is a block diagram depicting the network node 110, in the wireless communication system 100, such as e.g. a 5G system, for handling resource allocations for a first UE 120*a* out of a set of UEs 120. Each of the UEs 120 in the set of UEs 120 has a different frequency allocation for cyclic transmissions, such as cyclic UL and/or DL transmissions. The network node 110 may be an eNB in an E-UTRA system or a gNB in a NR system The network node 110 may comprise a processing unit 1600, such as e.g. one or more processors, a receiving unit 1601, a transmitting unit 1602, an obtaining unit 1603, a determining unit 1604, a configuring unit 1605 and/or an allocating unit 1606 as exemplifying hardware units configured to perform the method as described herein for the network node 110.

The network node 110 may be configured to, e.g. by means of the processing unit 1600 and/or the determining unit 1604 being configured to, determine, based on a data arrival pattern, such as e.g. a packet arrival time, of the cyclic transmissions for each of the UEs in the set of UEs 120, one or more TTI where a collision between UL and/or DL transmissions from and/or to two UEs 120 out of the set of UEs 120 may occur The network node 110 may be configured to, e.g. by means of the processing unit 1600 and/or the configuring unit 1605 and/or the allocating unit 1606 being configured to, reconfigure the frequency allocation for the first UE 120*a* of the two UEs 120 to overlap, at least partly, with the frequency of a second UE 120*b* of the two UEs 120 for the TTIs other than the TTIs where the collision between the UL transmissions and/or DL transmissions from and/or to the first and the second UEs 120*a*, 120*b* may occur.

The network node 110 may be configured to, e.g. by means of the processing unit 1600 and/or the sending unit 1602 being configured to, send a DCI message to the first UE 120*a*, wherein the DCI message comprises an updated frequency allocation for the TTIs other than the TTIs in which the collision between the UL transmissions from and/or DL transmissions from and/or to the first and second UEs 120*a*, 120*b* may occur.

The network node 110 may be configured to, e.g. by means of the processing unit 1600 and/or the sending unit 1602 being configured to, send a DCI message to the first UE 120*a* out of the two UEs 120, wherein the DCI message comprises an updated frequency allocation to overlap, at least partly, with the frequency of the second UE 120*b* for all TTIs.

The network node 110 may be configured to, e.g. by means of the processing unit 1600 and/or the sending unit 1602 and/or the configuring unit 1605 and/or the allocating unit 1606 being configured to, issue a dynamic grant to move the frequency allocation for the first UE 120*a* from the frequency of the second UE 120*b* to the previous frequency allocation of the first UE 120*a* for the TTIs where the collision between the transmissions to and/or from the first and second UE 120*a*, 120*b* may occur.

The network node 110 may also be configured to, e.g. by means of the processing unit 1600 and/or the sending unit 1602 and/or the configuring unit 1605 and/or the allocating unit 1606 being configured to, issue a dynamic grant to move the frequency allocation for the first UE 120*a* from the frequency of the second UE 120*b* to a frequency allocation not colliding with the frequency of the second UE 120*b* for the TTIs where the collision between the transmissions to and/or from the first and second UE 120*a*, 120*b* may occur.

The network node 110 may be configured to, e.g. by means of the processing unit 1600 and/or the sending unit 1602 and/or the configuring unit 1605 and/or the allocating unit 1606 being configured to, issue a dynamic grant to move the frequency allocation for the first UE 120*a* to overlap, at least partly, with the frequency of the second UE

120b for the TTIs other than the TTIs in which the collision between the transmissions to and/or from the first and second UEs 120a, 120b may occur.

The network node 110 may be configured to, e.g. by means of the processing unit 1600 and/or the determining unit 1604 being configured to, determine the first UE 120a out of the two UEs 120 to be the UE that has the highest channel quality of the first and second UE 120a, 120b.

The network node 110 may be configured to, e.g. by means of the processing unit 1600 and/or the determining unit 1604 being configured to, determine the first UE 120a out of the two UEs 120 to be the UE that has the lower or lowest priority of the of the first and second UE 120a, 120b.

The network node 110 may be configured to, e.g. by means of the processing unit 1600 and/or the configuring unit 1605 and/or the allocating unit 1606 being configured to, reconfigure the frequency allocation of the first UE 120a to overlap, at least partly, with the frequency allocation of the second UE 120b for the TTIs other than the TTIs where the collision between the transmissions to and/or from the first UE 120 and second UE 120b may occur.

In some embodiments the network node 110 may also select and/or determine to reallocate the spectrum for the UE 120 having the higher channel quality.

The network node 110 may be configured to, e.g. by means of the processing unit 1600 and/or the sending unit 1602 being configured to, send a Semi Persistent Scheduling, SPS, to respectively the first and the second UEs 120a, 120b. The SPS allocates different frequency resources for each UE 120a, 120b and overprovisions time resources as compared to an expected need of each of the UEs 120a, 120b.

The network node 110 may be configured to, e.g. by means of the processing unit 1600 and/or the determining unit 1604 being configured to, learn a data arrival pattern based on the SPS time resources that are used for transmission by the first and the second UEs 120a, 120b.

The network node 110 may be configured to, e.g. by means of the processing unit 1600 and/or the determining unit 1604 being configured to, determine based on the data arrival pattern of the two UE's 120a, 120b that time collision will be infrequent.

The network node 110 may be configured to, e.g. by means of the processing unit 1600 and/or the sending unit 1602 and/or the configuring unit 1605 and/or the allocating unit 1606 being configured to, reconfigure the frequency allocation for the first UE 120a to overlap, at least partly, with the frequency of the second UE 120b. This action X40 corresponds to the action 840 described in relation to FIG. 9.

The network node 110 may be configured to, e.g. by means of the processing unit 1600 and/or the sending unit 1602 and/or the configuring unit 1605 and/or the allocating unit 1606 being configured to, reconfigure the frequency allocation by sending a DCI message to the first UE 120a, wherein the DCI message comprises an updated frequency allocation.

The embodiments herein may be implemented through a respective processor or one or more processors of a processing circuitry in the network node 110 as depicted in FIG. 17, which processing circuitry is configured to perform the method actions according to FIG. 13 or 14 and the embodiments described above for the network node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the network node 110.

The transmitting device may further comprise a memory 1608. The memory may comprise one or more memory units to be used to store data on, such as e.g. resource allocations, software, patches, system information (SI), configurations, diagnostic data, performance data and/or applications to perform the methods disclosed herein when being executed, and similar.

The method according to the embodiments described herein for the network node 110 may be implemented by means of e.g. a computer program product 1609, 1701 or a computer program, comprising instructions, i.e., software code portions, which, when executed on at least one processor, cause at least one processor to carry out the actions described herein, as performed by the network node 110. The computer program product 1609, 1701 may be stored on a computer-readable storage medium 1610, 1702, e.g. a disc or similar. The computer-readable storage medium 1610, 1702, having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the network node 110.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 18:
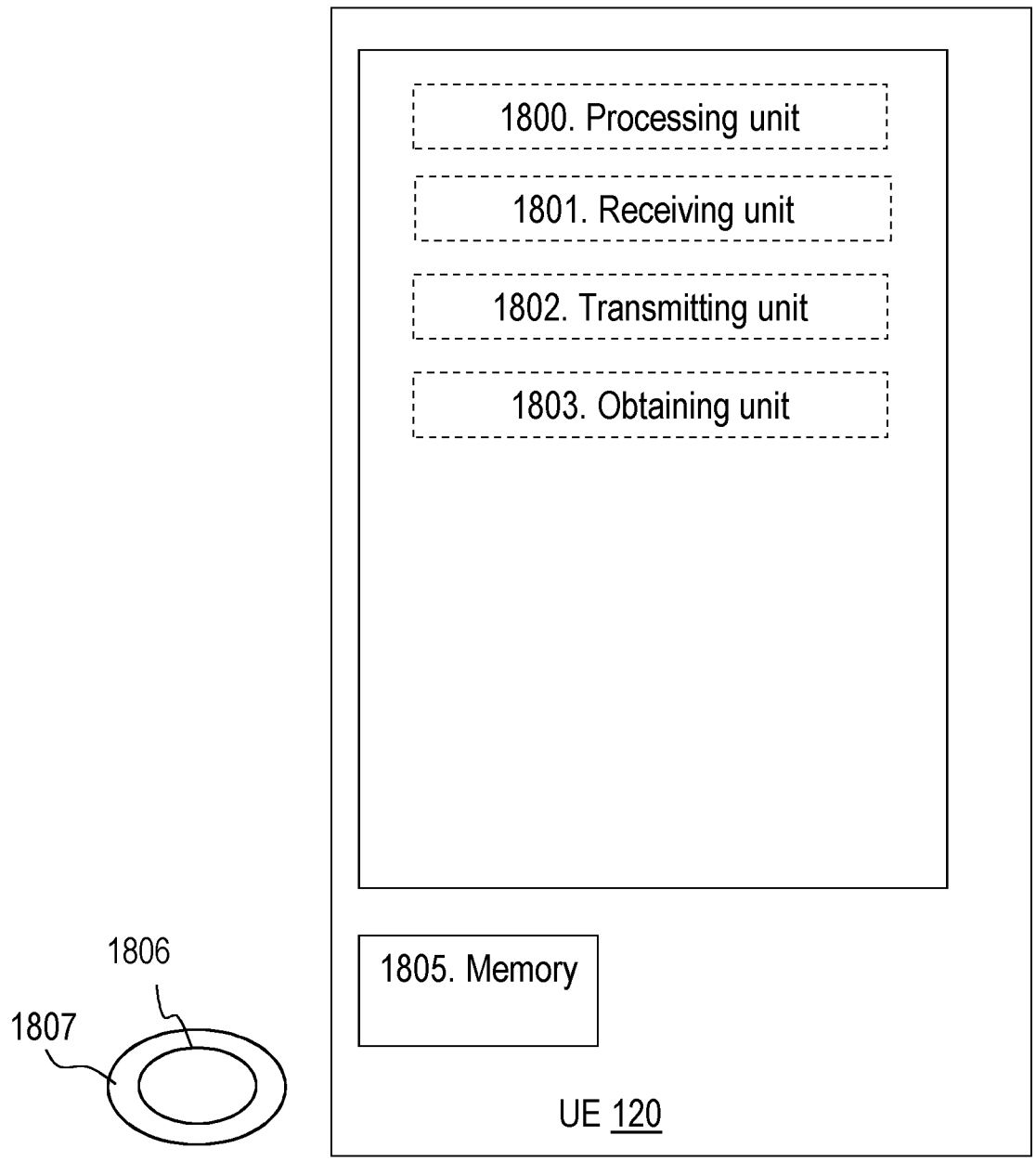
FIG. 18 is a schematic block diagram illustrating some first embodiments of a UE.

FIG. 18 is a block diagram depicting a first UE 120a out of a set of UEs 120 in a wireless communication system 100, for handling resource allocation for the first UE 120a. Each of the UEs 120 in the set of UEs 120 may have a different frequency allocation for cyclic transmissions, such as cyclic UL and/or DL transmissions.

The first UE 120*a* may comprise a processing unit 1800, such as e.g. one or more processors, a receiving unit 1801, a transmitting unit 1802 and/or an obtaining unit 1803 as exemplifying hardware units configured to perform the method as described herein for the first UE 120*a*.

The first UE 120*a* may be configured to, e.g. by means of the processing unit 1800 and/or the receiving unit 1801 and/or the obtaining unit 1803 being configured to, receive, from a network node 110 in the wireless communication system, receive a reconfiguration of the frequency allocation to overlap, at least partly, with the frequency of a second UE 120*b* out of the set UEs 120 for TTIs other than TTIs where a collision between UL transmissions from the first UE 120*a* and the second UEs 120*b* may occur.

The first UE 120*a* may be configured to, e.g. by means of the processing unit 1800 and/or the transmitting unit 1802 being configured to, transmit the cyclic UL transmissions using the reconfigured frequency allocation received from the network node 110.

The first UE 120*a* may be configured to, e.g. by means of the processing unit 1800 and/or the receiving unit 1801 and/or the obtaining unit 1803 being configured to, receive a reconfiguration of the frequency allocation to overlap, at least partly, with the frequency of a second UE 120*b* out of the set UEs 120 for TTIs other than TTIs where a collision between UL transmissions from the first UE 120*a* and the second UEs 120*b* may occur.

The first UE 120*a* may be configured to, e.g. by means of the processing unit 1800 and/or the receiving unit 1801 and/or the obtaining unit 1803 being configured to, receive a DCI message from the network node 110. The DCI message may comprise an updated frequency allocation for the TTIs other than the TTIs in which the collision between the UL transmissions from the first UE 120*a* and the second UE 120*b* may occur.

The first UE 120*a* may be configured to, e.g. by means of the processing unit 1800 and/or the receiving unit 1801 and/or the obtaining unit 1803 being configured to, receive a DCI message from the network node 110. The DCI message may comprise an updated frequency allocation to overlap, at least partly, with the frequency of the second UE 120*b* for all TTIs.

The first UE 120*a* may be configured to, e.g. by means of the processing unit 1800 and/or the receiving unit 1801 and/or the obtaining unit 1803 being configured to, receive a dynamic grant to change the frequency allocation to the previous frequency allocation of the first UE 120*a* for TTIs where a collision between the UL transmissions from the first UE 120*a* and the second UE 120*b* may occur. The first UE 120 may be configured to, e.g. by means of the processing unit 1800 and/or the receiving unit 1801 and/or the obtaining unit 1803 being configured to, receive a dynamic grant to change the frequency allocation to a frequency allocation not colliding with the frequency of the second UE 120*b* for TTIs where a collision between the UL transmissions from the first UE 120*a* and the second UE 120*b* may occur.

The first UE 120*a* may be configured to, e.g. by means of the processing unit 1800 and/or the receiving unit 1801 and/or the obtaining unit 1803 being configured to, receive a dynamic grant to change the frequency allocation to overlap, at least partly, with the frequency of the second UE 120*b* for the TTIs other than the TTIs in which a collision between the UL transmissions from the first UE 120*a* and the second UE 120*b* may occur.

The embodiments herein may be implemented through a respective processor or one or more processors of a processing circuitry in the first UE 120*a* as depicted in FIG. 19, which processing circuitry is configured to perform the method actions according to FIG. 14 and the embodiments described above for the first UE 120*a*.

The embodiments may be performed by the processor together with respective computer program code for performing the functions and actions of the embodiments herein described for the first UE 120*a*. The program code mentioned above may also be provided as a computer program product, for instance in the form of a data carrier carrying computer program code for performing the embodiments herein when being loaded into the first UE 120*a*. One such carrier may be in the form of a CD ROM disc. It is however feasible with other data carriers such as e.g. a memory stick. The computer program code may furthermore be provided as pure program code on a server and downloaded to the first UE 120*a*.

The first UE 120*a* may further comprise a memory 1805. The memory may comprise one or more memory units to be used to store data on, such as e.g. information regarding the retransmissions, PUSCH resource table, software, patches, system information (SI), configurations, diagnostic data, performance data and/or applications to perform the methods disclosed herein when being executed, and similar.

The method according to the embodiments described herein for first UE 120*a* may be implemented by means of e.g. a computer program product 1806, 1901 or a computer program, comprising instructions, i.e., software code portions, which, when executed on at least one processor, cause at least one processor to carry out the actions described herein, as performed by the first UE 120*a*. The computer program product 1806, 1901 may be stored on a computer-readable storage medium 1807, 1902, e.g. a disc or similar. The computer-readable storage medium 1807, 1902, having stored thereon the computer program, may comprise instructions which, when executed on at least one processor, cause the at least one processor to carry out the actions described herein, as performed by the first UE 120*a*. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the first UE 120*a*.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

It shall be noted that the nodes mentioned herein may be arranged as separate nodes or may be collocated within one or more nodes in the communications network. When a plurality of nodes are collocated in one node, the single node may be configured to perform the actions of each of the collocated nodes.

Further Extensions and Variations

Figure 20:
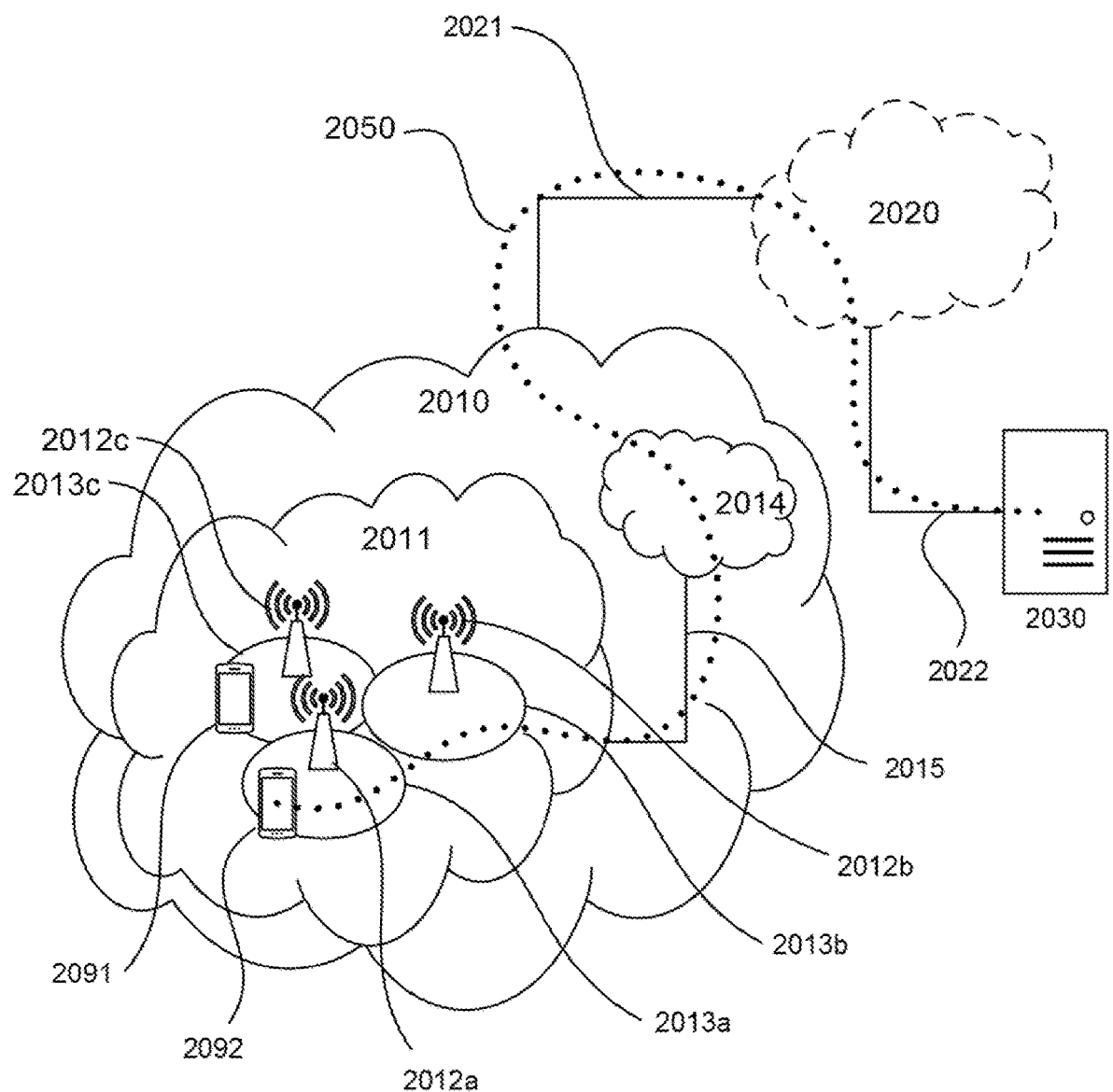
FIG. 20 is a schematic block diagram illustrating a host computer communicating via a base station with a user equipment over a partially wireless connection in accordance with some embodiments.

With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012a, 2012b, 2012c, e.g. the network node 110, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A first UE 2091, such as the UE 120, located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server or a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink (UL) and downlink (DL) communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

Figure 21:
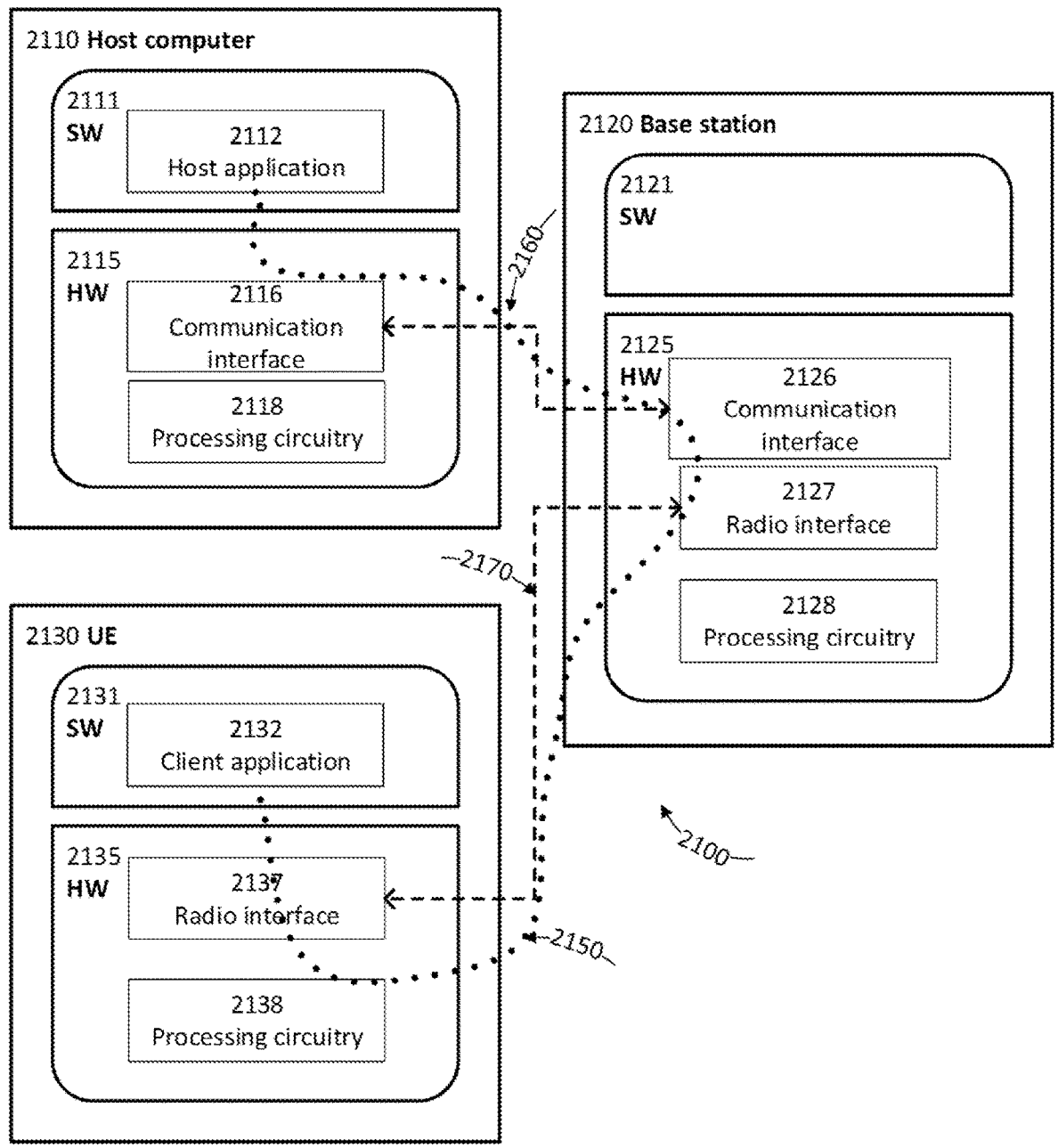
FIG. 21 is a schematic overview of a host computer communicating via a base station with a user equipment over a partially wireless connection in accordance with some embodiments.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the teachings of these embodiments may improve the resource allocation for periodic traffic with configured grants sent via the communications network and thereby provide benefits such as reduced latency of the communications network, in particular when handling periodic with semi-persistent scheduling.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figures 24, 25:
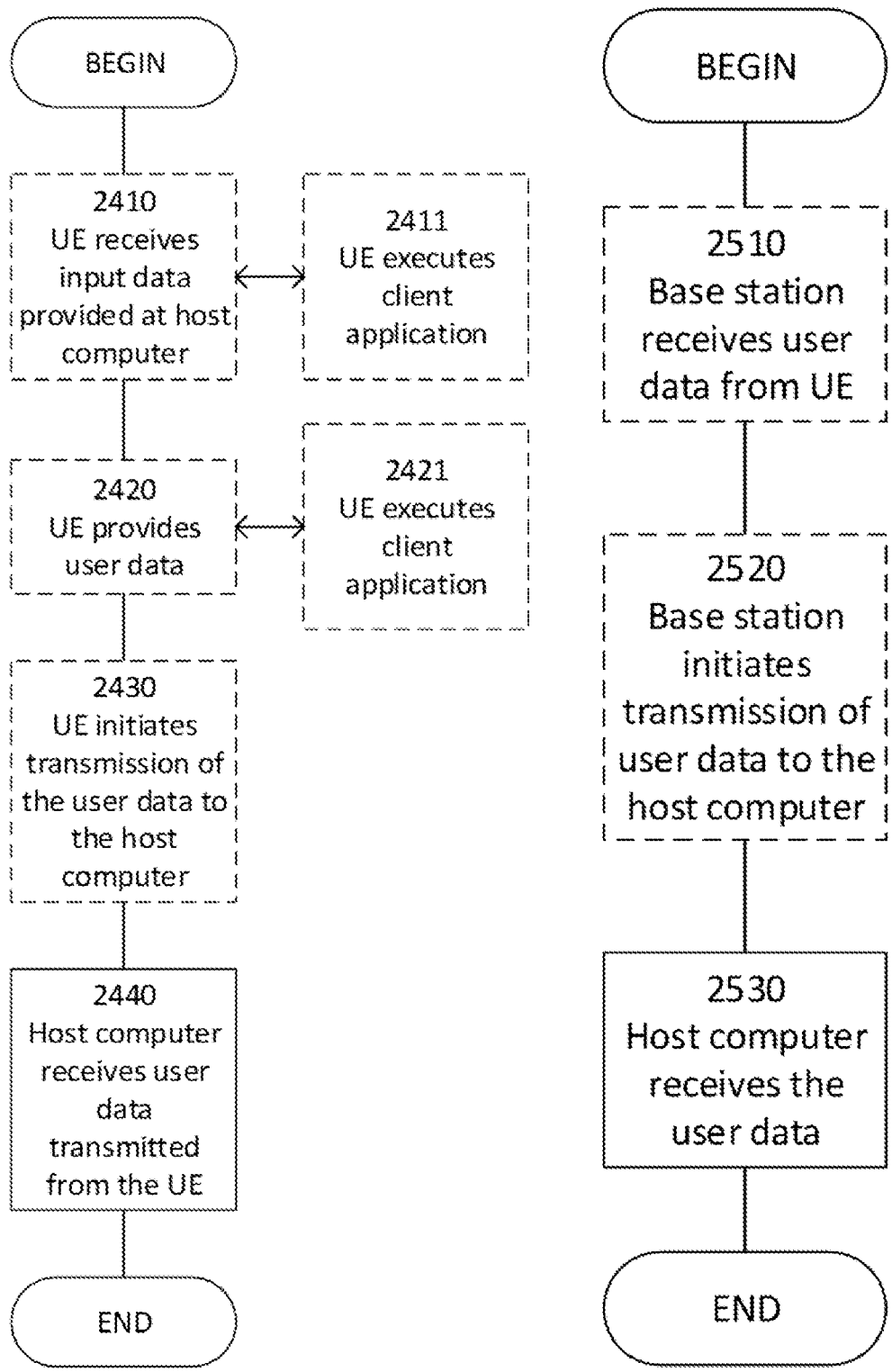
FIG. 24 is a flowchart depicting methods implemented in a communication system including a host computer, a base station and a user equipment in accordance with some embodiments.
FIG. 25 is a flowchart depicting methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Below, some example embodiments are described.

Embodiment 1. A method, performed by a network node (110) in a wireless communication system (100), for handling resource allocations for a first User Equipment, UE (120a) and a second UE (120b) out of a set of UEs (120), wherein each of the UEs (120) in the set of UEs (120) has a different pre-configured frequency allocation for cyclic uplink, UL, transmissions, wherein the method comprises:
send (1410) a Semi Persistent Scheduling, SPS, to respectively the first and the second UEs (120a, 120b) that allocates different frequency resources for each UE (120a, 120b) and that overprovisions time resources as compared to an expected need;
learn (1420) a data arrival pattern based on the SPS time resources that are used for transmission by the first and the second UEs (120a, 120b);
determining (1430) based on the data arrival pattern of the two UE's (120a, 120b) that time collision will be infrequent;
reconfiguring (1440) the frequency allocation for the first UE (120a) to overlap with the frequency of the second UE (120b).

Embodiment 2. The method according to Embodiment 1, wherein the step of reconfiguring (1440) comprises:
sending a DCI message to the first UE (120a), wherein the DCI message comprises an updated frequency allocation.

The invention claimed is:

1. A method, performed by a network node in a wireless communication system, for handling resource allocations for a first User Equipment, UE out of a set of UEs, wherein the method comprises:
assigning each of the UEs in the set of UEs a different frequency allocation to be used for time wise cyclic transmissions;
configuring the UEs with a configured grant periodicity that overprovisions the time resources as compared to an expected need of each of the UEs,
determining, based on a data arrival pattern of the cyclic transmissions from each of the UEs in the set of UEs, one or more TTIs, where a collision between transmissions from two UEs out of the set of UEs may occur,
reconfiguring the frequency allocation for a first UE of the two UEs to overlap, at least partly, with the frequency allocation of a second UE out of the two UEs for the TTIs other than the TTIs where the collision between the transmissions to and/or from the first and the second UEs may occur, wherein the step of reconfiguring comprises issuing a dynamic grant to move the frequency allocation for the first UE to overlap with the frequency of the second UE for the TTIs other than the TTIs in which the collision between the transmissions to and/or from the first and second UEs may occur.

2. The method according to claim 1, wherein the step of reconfiguring comprises:
sending a DCI message to the first UE, wherein the DCI message comprises an updated frequency allocation for the TTIs other than the TTIs in which the collision between the transmissions to and/or from the first and second UEs may occur.

3. The method according to claim 1, wherein the step of reconfiguring further comprises:
sending a DCI message to the first UE out of the two UEs, wherein the DCI message comprises an updated frequency allocation to overlap with the frequency of the second UE for all TTIs, and
for the TTIs where the collision between the transmissions to and/or from the first and second UE may occur, issuing a dynamic grant to move the frequency allocation for the first UE from the frequency of the second UE to the previous frequency allocation of the first UE.

4. The method according to claim 1, wherein the data arrival pattern is a data arrival pattern of a cyclic Uplink, UL, transmission.

5. The method according to claim 1, wherein the method further comprises:
determining the first UE out of the two UEs to be the UE that has the highest channel quality of the first and second UE.

6. The method according to claim 1, wherein the method further comprises:
determining the first UE out of the two UEs to be the UE that has a lower priority of the first and second UE.

7. A network node in a wireless communication system, for handling resource allocations for a first User Equipment, UE out of a set of UEs, wherein each of the UEs in the set of UEs has a different pre-configured frequency allocation to be used for time wise cyclic transmissions, wherein the network node is configured to:
configure the UEs with a configured grant periodicity that overprovisions the time resources as compared to an expected need of each of the UEs,
determine, based on a data arrival pattern of the cyclic transmissions from each of the UEs in the set of UEs, one or more Transmission Time Intervals, TTI, where a collision between transmissions from two UEs out of the set of UEs may occur,
reconfigure the frequency allocation for a first UE of the two UEs to overlap the frequency allocation of a second UE of the two UEs for the TTIs other than the TTIs where the collision between the transmissions from the first and the second UEs may occur,
issue a dynamic grant to move the frequency allocation for the first UE to overlap, at least partly, with the frequency of the second UE for the TTIs other than the TTIs in which the collision between the transmissions from the first and second UEs may occur.

8. The network node according to claim 7, wherein the network node is further configured to:

send a DCI message to the first UE, wherein the DCI message comprises an updated frequency allocation for the TTIs other than the TTIs in which the collision between the transmissions from the first and second UEs may occur.

9. The network node according to claim 8, wherein the network node is further configured to:
send a DCI message to the first UE out of the two UEs, wherein the DCI message comprises an updated frequency allocation to overlap, at least partly, with the frequency of the second UE for all TTIs, and
for the TTIs where the collision between the transmissions from the first and second UE may occur, issue a dynamic grant to move the frequency allocation for the first UE from the frequency of the second UE to the previous frequency allocation of the first UE.

10. The network node according to claim 7, wherein the data arrival pattern is a data arrival pattern of a cyclic Up Link, UL, transmission.

11. The network node according to claim 7, wherein the network node is further configured to:
determine the first UE out of the two UEs to be the UE that has the highest channel quality of the first and second UE.

12. The network node according to claim 7, wherein the network node is further configured to:
determine the first UE out of the two UEs to be the UE that has a lower priority of the first and second UE.

13. A non-transitory computer-readable medium comprising instructions, which when executed by a processor, causes the processor to perform actions according to claim 7.

* * * * *